(12) United States Patent
Teyeb et al.

(10) Patent No.: US 11,516,829 B2
(45) Date of Patent: Nov. 29, 2022

(54) ENHANCED UPLINK SCHEDULING IN INTEGRATED ACCESS BACKHAUL (IAB) NETWORKS

(71) Applicant: TELEFONAKTIEBOLAGET LM ERICSSON (PUBL), Stockholm (SE)

(72) Inventors: Oumer Teyeb, Solna (SE); Ajmal Muhammad, Sollentuna (SE); Jose Luis Pradas, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/271,255

(22) PCT Filed: Sep. 17, 2019

(86) PCT No.: PCT/IB2019/057829
§ 371 (c)(1),
(2) Date: Feb. 25, 2021

(87) PCT Pub. No.: WO2020/065446
PCT Pub. Date: Apr. 2, 2020

(65) Prior Publication Data
US 2021/0345369 A1 Nov. 4, 2021

Related U.S. Application Data

(60) Provisional application No. 62/736,742, filed on Sep. 26, 2018.

(51) Int. Cl.
*H04W 72/12* (2009.01)
*H04W 28/02* (2009.01)
*H04W 72/14* (2009.01)

(52) U.S. Cl.
CPC ... *H04W 72/1268* (2013.01); *H04W 28/0278* (2013.01); *H04W 72/14* (2013.01)

(58) Field of Classification Search
CPC ......... H04W 72/1268; H04W 28/0278; H04W 72/14; H04W 84/047; H04W 72/1284; H04B 7/15542
See application file for complete search history.

(56) References Cited

U.S. PATENT DOCUMENTS

| 8,248,941 B2 | 8/2012 | Teyeb et al. |
| 2011/0269393 A1 | 11/2011 | Östergaard et al. |

(Continued)

OTHER PUBLICATIONS

ETRI, "Discussions on Buffer Status Report over Un interface", 3GPP TSG RAN WG2 #69bis, Beijing, China, Apr. 12-16, 2010, pp. 1-3, R2-102252, 3GPP.

(Continued)

*Primary Examiner* — Dinh Nguyen

(57) ABSTRACT

Embodiments include methods, performed by first node in an integrated access backhaul (IAB) network, for scheduling uplink (UL) transmissions in the IAB network. Such methods include receiving, from a first downstream node in the IAB network, a first buffer status report (BSR) indicating a first amount of UL data, with the first amount including UL data buffered at the first downstream node, and/or UL data expected to be received by the first downstream node. Such methods also include sending, to the first downstream node, a first UL resource grant indicating a time schedule of resources available for the first downstream node to transmit at least a portion of the first amount of UL data. In some embodiments, the first UL resource grant is sent after receiving the first BSR and without receiving a second UL resource grant from an upstream node in response to a second BSR.

17 Claims, 20 Drawing Sheets

(56) References Cited

U.S. PATENT DOCUMENTS

2014/0192638 A1* 7/2014 Taneja .............. H04W 28/0268
                                                      370/229
2019/0159277 A1* 5/2019 Zhu ....................... H04W 92/12
2019/0357247 A1* 11/2019 Keskitalo .......... H04W 72/1284

OTHER PUBLICATIONS

Huawei et al., "Pre-BSR Enabling Fast Scheduling", 3GPP TSG-RAN WG2 Meeting #103, Gothenburg, Sweden, Aug. 20-24, 2018, pp. 1-3, R2-1812881, 3GPP.
LG Electronics Inc., "Scheduling enhancement in IAB", 3GPP TSG-RAN WG2 Meeting #103, Gothenburg, Sweden, Aug. 20-24, 2018, pp. 1-2, R2-1812638, 3GPP.

* cited by examiner

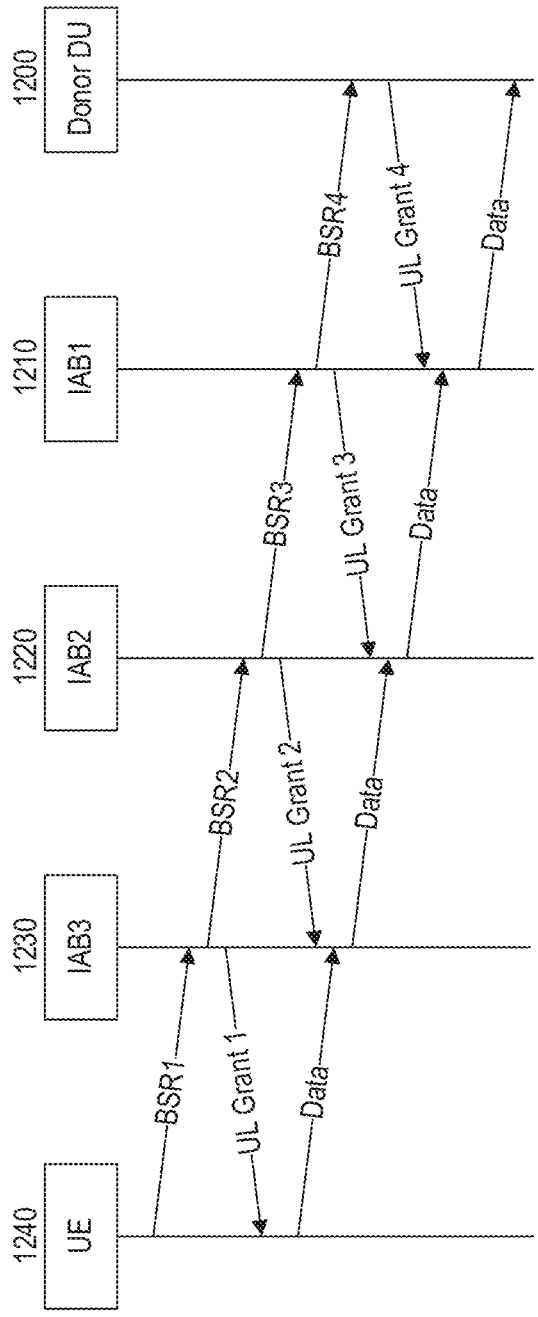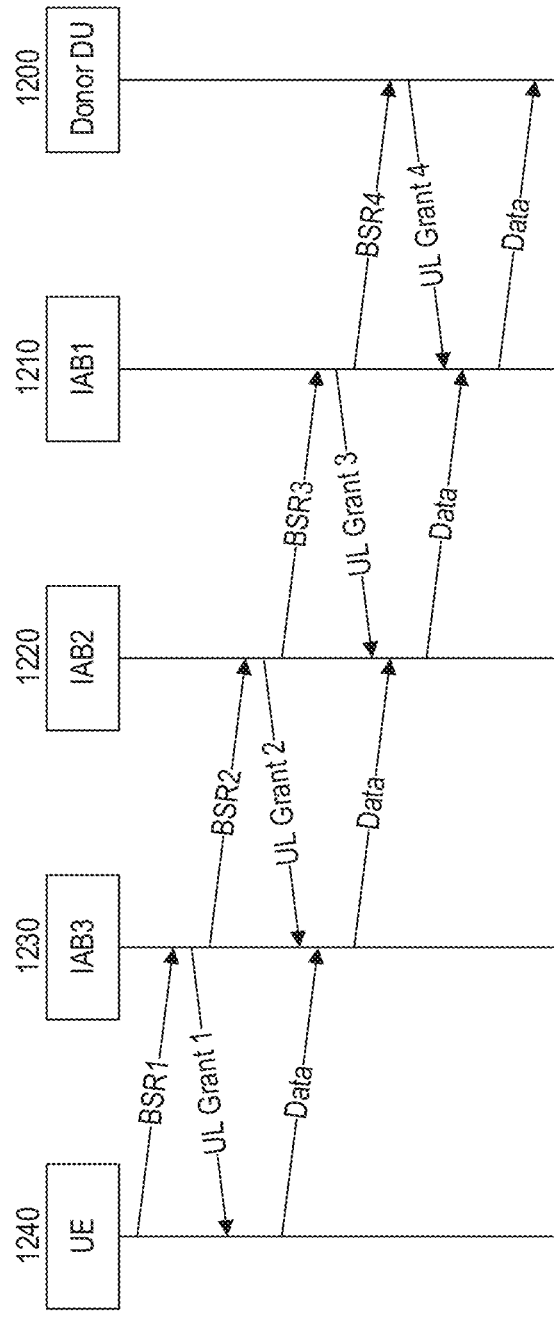
FIG. 14
FIG. 15

```
┌─────────────────────────────────────────────────────────────────────────┐
│ Receiving, from a first downstream node in the IAB network, a first buffer status report │
│ (BSR) indicating a first amount of uplink (UL) data, wherein the first amount includes   │─ 1610
│                         one or more of the following:                                     │
│           an amount of UL data buffered at the first downstream node, and                 │
│        an amount of UL data expected to be received by the first downstream node.         │
└─────────────────────────────────────────────────────────────────────────┘
                                         │
                                         ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Determining one or more of the following based on a first hop count value received in    │
│ the first BSR: a time schedule to be indicated an UL grant, and a second amount of       │─ 1620
│              UL data to be indicated by a second BSR.                                    │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│ │ Reducing the first amount of data by a scaling factor that is dependent upon │ 1621   │
│ │                    the first hop count value.                                │         │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│ │ Determining the second amount of UL data based on the reduced first amount  │ 1622   │
│ │              and the UL data buffered at the first node.                    │         │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│ │  Estimating a delay based on the first hop count and scheduling information │         │
│ │  associated with a further downstream node having buffered UL data included │ 1623   │
│ │                         in the first amount.                                │         │
│ ├─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┤   │
│ │ Based on the estimated delay, determining the time schedule such that the first │     │
│ │   UL resource grant becomes valid when the UL data buffered at the further      │ 1624│
│ │              downstream node is available at the first downstream node.         │     │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                         │
                                         ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Incrementing the first hop count value, received in the first BSR, to form a second hop │─ 1630
│                  count value to be indicated by a second BSR.                            │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                         │
                                         ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Determining one or more of the following based on a time value received in the first    │─ 1640
│ BSR: a time schedule to be indicated an UL grant, and a second amount of UL data to     │
│              be indicated by a second BSR.                                               │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│ │ Reducing the first amount of data by a scaling factor that is dependent upon │ 1641   │
│ │                         the time value.                                      │         │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│ │ Determining the second amount of UL data based on the reduced first amount  │ 1642   │
│ │              and the UL data buffered at the first node.                    │         │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│ │ Estimating a delay based on a difference between the time value and the     │ 1643   │
│ │                              current time.                                  │         │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│ │ Based on the estimated delay, determining the time schedule such that the first │     │
│ │   UL resource grant becomes valid when the UL data buffered at the further      │ 1644│
│ │              downstream node is available at the first downstream node.         │     │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                         │
                                         ▼
┌─────────────────────────────────────────────────────────────────────────┐
│    Sending, to the first downstream node, a first UL resource grant indicating a time    │
│   schedule of resources available for the first downstream node to transmit at least a    │─ 1650
│                          portion of the first amount of data.                             │
└─────────────────────────────────────────────────────────────────────────┘
                                         │
                                         ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Sending a second BSR to an upstream node in the IAB network, wherein the second         │
│ BSR indicates a second amount of UL data, and the second amount includes the at         │─ 1660
│         least a portion of the first amount and UL data buffered at the first node.      │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

*FIG. 16*

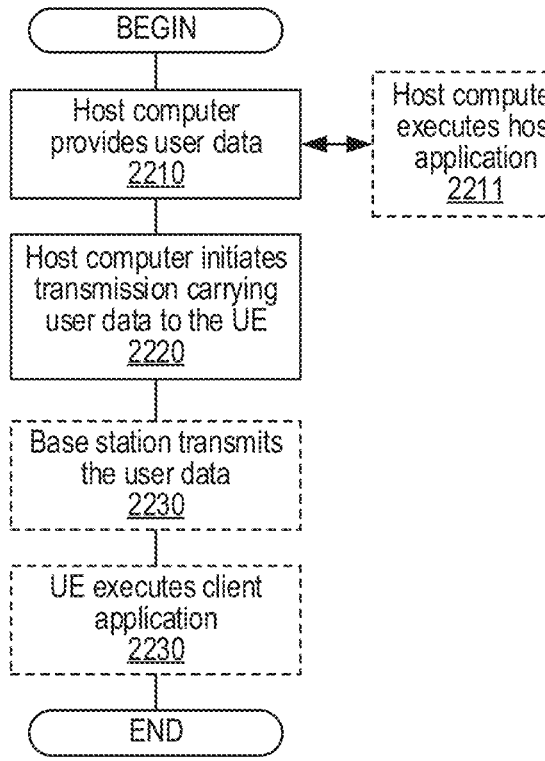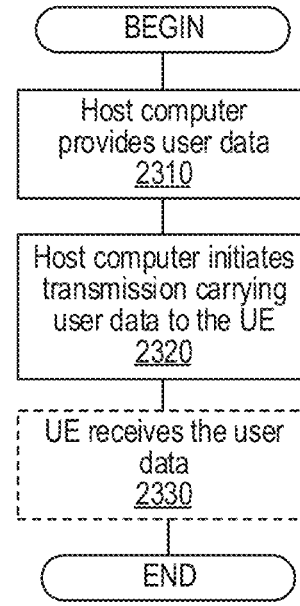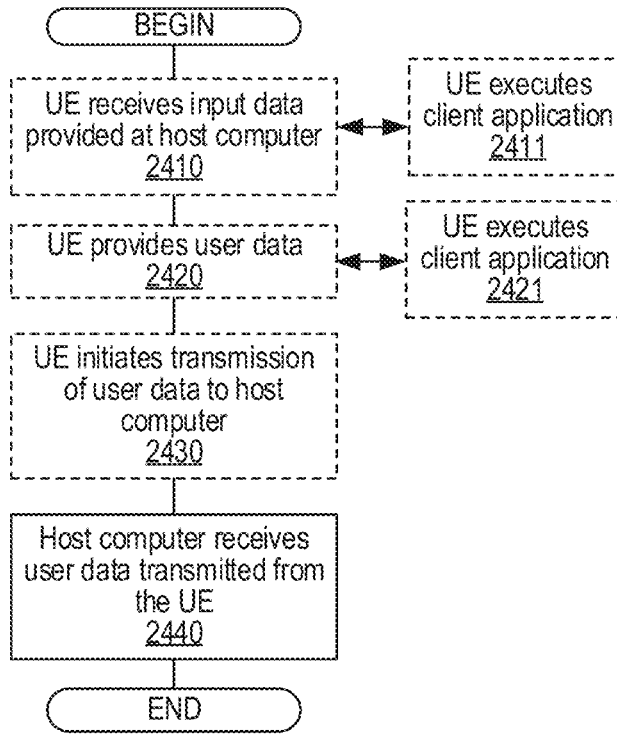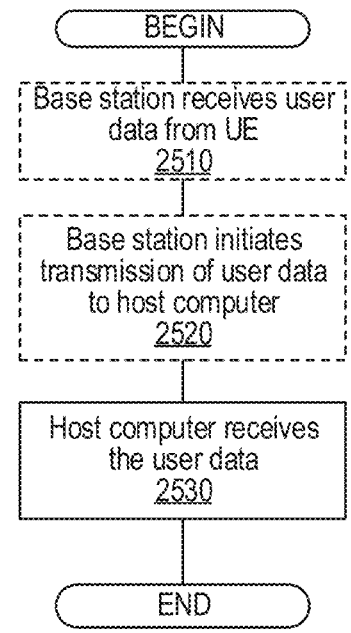
FIG. 22
FIG. 23
FIG. 24
FIG. 25

US 11,516,829 B2

ENHANCED UPLINK SCHEDULING IN INTEGRATED ACCESS BACKHAUL (IAB) NETWORKS

The present application is a 371 of International Application No. PCT/M2019/057829, filed Sep. 17, 2019, which claims the benefit of and priority to U.S. Provisional Patent Application No. 62/736,742, filed Sep. 26, 2018, entitled "ENHANCED UPLINK SCHEDULING IN INTEGRATED ACCESS BACKHAUL (IAB) NETWORKS," the disclosures of which are hereby incorporated herein by reference in their entirety.

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the disclosed embodiments will be apparent from the following description.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMF) in the 5GC 198 via respective NG-C interfaces. Similarly, gNBs 100, 150 can be connected to one or more User Plane Functions (UPFs) in 5GC 198 via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect to the NR interface to UEs, each of the gNBs can support frequency division duplexing (FDD), time division duplexing (TDD), or a combination thereof.

Although not shown, in some deployments 5GC 298 can be replaced by an Evolved Packet Core (EPC), which conventionally has been used together with a Long-Term Evolution (LTE) Evolved UMTS RAN (E-UTRAN). In such deployments, gNBs 200, 250 (referred to as "en-gNBs" in this scenario) may be connected to the EPC via the S1-U interface and to each other (and/or to other en-gNBs) via the X2-U interface.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (version 15.2.0). If security protection for CP and UP data on TNL of NG-RAN interfaces is supported, NDS/IP (3GPP TS 33.401 (version 15.4.0)) shall be applied.

The NG-RAN logical nodes shown in FIG. 1 (and described in 3GPP TS 38.401 (version 15.2.0) and 3GPP TR 38.801 (version 14.0.0)) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Furthermore, the F1 interface between the gNB-CU and gNB-DU is specified and/or based on the following general principles:
F1 is an open interface;
F1 supports the exchange of signalling information between respective endpoints, as well as data transmission to the respective endpoints;
from a logical standpoint, F1 is a point-to-point interface between the endpoints (even in the absence of a physical direct connection between the endpoints);
F1 supports control plane and user plane separation into respective F1-AP protocol and F1-U protocol (also referred to as NR User Plane Protocol), such that a gNB-CU may also be separated in CP and UP;
F1 separates Radio Network Layer (RNL) and Transport Network Layer (TNL);
F1 enables exchange of user-equipment (UE) associated information and non-UE associated information;
F1 is defined to be future proof with respect to new requirements, services, and functions;
A gNB terminates X2, Xn, NG and S1-U interfaces and, for the F1 interface between DU and CU, utilizes the F1-AP protocol that is defined in 3GPP TS 38.473 (version 15.2.1).

In addition, the F1-U protocol is used to convey control information related to the user data flow management of data radio bearers, as defined in 3GPP TS 38.425 (version 15.2.0). The F1-U protocol data is conveyed by the GTP-U protocol, specifically, by the "RAN Container" GTP-U extension header as defined in 3GPP TS 29.281 (version 15.3.0). In other words, the GTP-U protocol over user datagram protocol (UDP) over IP carries data streams on the F1 interface. A GTP-U "tunnel" between two nodes is identified in each node by tunnel endpoint identifier (TEID), an IP address, and a UDP port number. A GTP-U tunnel is necessary to enable forwarding packets between GTP-U entities.

In addition, a CU can host protocols such as radio resource control (RRC) protocol and packet data convergence protocol (PDCP), while a DU can host protocols such as RLC, MAC and PHY. Other variants of protocol distributions between CU and DU can exist, however, such as hosting RRC, PDCP, and part of RLC protocol in the CU (e.g., Automatic Retransmission Request (ARQ) function), while hosting physical layer (PHY), medium access control (MAC) protocol, and the remaining parts of RLC in the DU. In some embodiments, a CU can host RRC and PDCP, where PDCP is assumed to handle both UP traffic and CP traffic. Nevertheless, other embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane), with the E1 open interface between (see 3GPP TS 38.463 (version 15.0.0)). The CU-CP and CU-UP parts communicate with each other using the E1-AP protocol over the E1 interface. The CU-CP/UP separation is illustrated in FIG. 2. Three deployment scenarios for the split gNB architecture shown in FIG. 2 are defined in 3GPP TR 38.806 (version 15.0.0):

Scenario 1: CU-CP and CU-UP centralized;
Scenario 2: CU-CP distributed and CU-UP centralized;
Scenario 3: CU-CP centralized and CU-UP distributed.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative. One such approach is an integrated access backhaul (IAB) network where the operator can utilize part of the radio resources for the backhaul link.

IAB was studied earlier in 3GPP in the scope of Long Term Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node on the same Donor eNB from the CN. During the Rel-10 study, other architectures were also considered including, e.g., where the RNs are more transparent to the Donor gNB and allocated a separate stand-alone P/S-GW node.

For 5G/NR, similar options utilizing IAB can also be considered. One difference compared to LTE is the gNB-CU/DU split described above, which separates time critical RLC/MAC/PHY protocols from less time critical RRC/PDCP protocols. It is anticipated that a similar split could also be applied for the IAB case. Other IAB-related differences anticipated in NR as compared to LTE are the support of multiple hops and the support of redundant paths.

FIG. 3 shows a reference diagram for an IAB network in standalone mode, as further explained in 3GPP TR 38.874 (version 0.2.1). The IAB network shown in FIG. 3 includes an IAB-donor 340 and multiple IAB-nodes 311-315, all of which can be part of a radio access network (RAN) such as an NG-RAN. IAB donor 340 includes DUs 321, 322 connected to a CU, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT) function of each IAB-node 311-315 terminates the radio interface layers of the wireless backhaul towards a corresponding "upstream" (or "northbound") DU function. This MT functionality is similar to functionality that enables UEs to access the IAB network and, in fact, has been specified by 3GPP as part of the Mobile Equipment (ME).

In the context of FIG. 3, upstream DUs can include either DU 321 or 322 of IAB donor 340 and, in some cases, a DU function of an intermediate IAB node that is "downstream" (or "southbound") from IAB donor 340. As a more specific example, IAB-node 314 is downstream from IAB-node 312 and DU 321, IAB-node 312 is upstream from IAB-node 314 but downstream from DU 321, and DU 321 is upstream from IAB-nodes 312 and 314. The DU functionality of IAB nodes 311-315 also terminates the radio interface layers toward UEs (e.g., for network access via the DU) and other downstream IAB nodes.

As shown in FIG. 3, IAB-donor 340 can be treated as a single logical node that comprises a set of functions such as gNB-DUs 321-322, gNB-CU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

Each IAB-node DU connects to the IAB-donor CU using a modified form of F1, which is referred to as F1*. The user-plane portion of F1* (referred to as "F1*-U") runs over RLC channels on the wireless backhaul between the MT on the serving IAB-node and the DU on the IAB donor.

In addition, an adaptation layer is included to hold routing information, thereby enabling hop-by-hop forwarding by IAB nodes. In some sense, the adaptation layer replaces the IP functionality of the standard F1 stack. F1*-U may carry a GTP-U header for the end-to-end association between CU and DU (e.g., IAB-node DU). In a further enhancement, information carried inside the GTP-U header can be included into the adaption layer. Furthermore, in various alternatives, the adaptation layer for IAB can be inserted either below or above the RLC layer. Optimizations to RLC layer itself are also possible, such as applying ARQ only on the end-to-end connection (i.e., between the donor DU and the IAB node MT) rather than hop-by-hop along access and backhaul links (e.g., between downstream IAB node MT and upstream IAB node DU).

In NR, Buffer Status Reports (BSRs) are used for requesting UL-SCH resources from the network when a UE needs to send new data. Various BSR mechanisms have been defined for NR. Even so, there can be various issues and/or problems that occur when applying conventional BSR mechanisms in an IAB network that can include several IAB nodes between a donor DU and a UE.

SUMMARY

Accordingly, exemplary embodiments of the present disclosure address these and other difficulties in schedule of uplink (UL) transmissions in a 5G network comprising IAB nodes, thereby enabling the otherwise-advantageous deployment of IAB solutions.

Exemplary embodiments of the present disclosure include methods and/or procedures for scheduling uplink (UL) transmissions in an integrated access backhaul (IAB) network, according to various exemplary embodiments of the present disclosure. The exemplary methods and/or procedures can be performed by a first node (e.g., an intermediate IAB node or a donor DU node associated with a base station) in an radio access network (RAN).

The exemplary methods and/or procedures can include receiving, from a first downstream node in the IAB network, a first buffer status report (BSR) indicating a first amount of uplink (UL) data. The first amount of data can include an amount of UL data buffered at the first downstream node, and/or an amount of UL data expected to be received by the first downstream node. The exemplary methods and/or procedures can also include sending, to the first downstream node, a first UL resource grant indicating a time schedule of resources available for the first downstream node to transmit at least a portion of the first amount of data.

In some embodiments, the exemplary methods and/or procedures can also include sending a second BSR to an upstream node in the IAB network. The second BSR can indicate a second amount of UL data, with the second amount including the at least a portion of the first amount as well as UL data buffered at the first node. In some embodiments, the first UL resource grant can be sent after receiving the first BSR and without receiving a second UL resource grant from the upstream node in response to the second BSR. In some embodiments, the first UL resource grant can be sent to the first downstream node before sending the second BSR to the upstream node.

In some embodiments, the second amount of UL data indicated by the second BSR can be based the first amount of UL data indicated in the first BSR, or on an amount of UL data indicated by the first UL resource grant. In some embodiments, the second amount of UL data indicated by the second BSR can be further based on free buffer space available, at the first node, for receiving UL data from the first downstream node.

In some embodiments, the first BSR can include a first hop count value that indicates a number of downstream intermediate nodes between the first downstream node and a further downstream node having buffered UL data included in the first amount. In such embodiments, the exemplary methods and/or procedures can also include incrementing the first hop count value to form a second hop count value, and the second hop count value can be included in the second BSR sent to the upstream node. In such embodiments, the exemplary methods and/or procedures can also include determining one or more of the following based on the first hop count value: the time schedule indicated by the UL grant, and the second amount of UL data indicated by the second BSR.

In other embodiments, the first BSR can include a time count value that indicates when one of the following received a further BSR related to the first BSR: the first downstream node, or a second downstream node that is downstream in the IAB network with respect to the first downstream node. In such embodiments, the exemplary methods and/or procedures can also include determining one or more of the following based on the time value: the time schedule indicated by the UL grant, and the second amount of UL data indicated by the second BSR.

In some embodiments, the first node can be an intermediate IAB node in the IAB network that includes, e.g., a distributed unit (DU) part and a mobile terminal (MT) part. In such embodiments, receiving the first BSR and sending the first UL resource grant can be performed by the DU part, and sending the second BSR can be performed by the MT part.

Other exemplary embodiments include network nodes (e.g., IAB nodes, donor DU nodes, etc., or components thereof) configured to perform operations corresponding to any of the exemplary methods and/or procedures described herein. Other exemplary embodiments include non-transitory, computer-readable media storing computer-executable instructions that, when executed by processing circuitry of a network node, configure the network node to perform operations corresponding to any of the exemplary methods and/or procedures described herein.

These and other objects, features, and advantages of the present disclosure will become apparent upon reading the following Detailed Description in view of the Drawings briefly described below.

BRIEF DESCRIPTION OF THE DRAWINGS

FIGS. 14-15 show signal flow diagrams for exemplary UL scheduling mechanisms in a multi-hop IAB network, according to various exemplary embodiments of the present disclosure.

FIG. 16 illustrates an exemplary method and/or procedure performed by a network node (e.g., an intermediate IAB node or donor DU) in a radio access network (e.g., NG-RAN), according to various exemplary embodiments of the present disclosure.

FIGS. 22-25 are flow diagrams of exemplary methods and/or procedures for transmission and/or reception of user data that can be implemented, for example, in the exemplary communication systems and/or networks illustrated in FIGS. 20-21.

DETAILED DESCRIPTION

Figure 1:
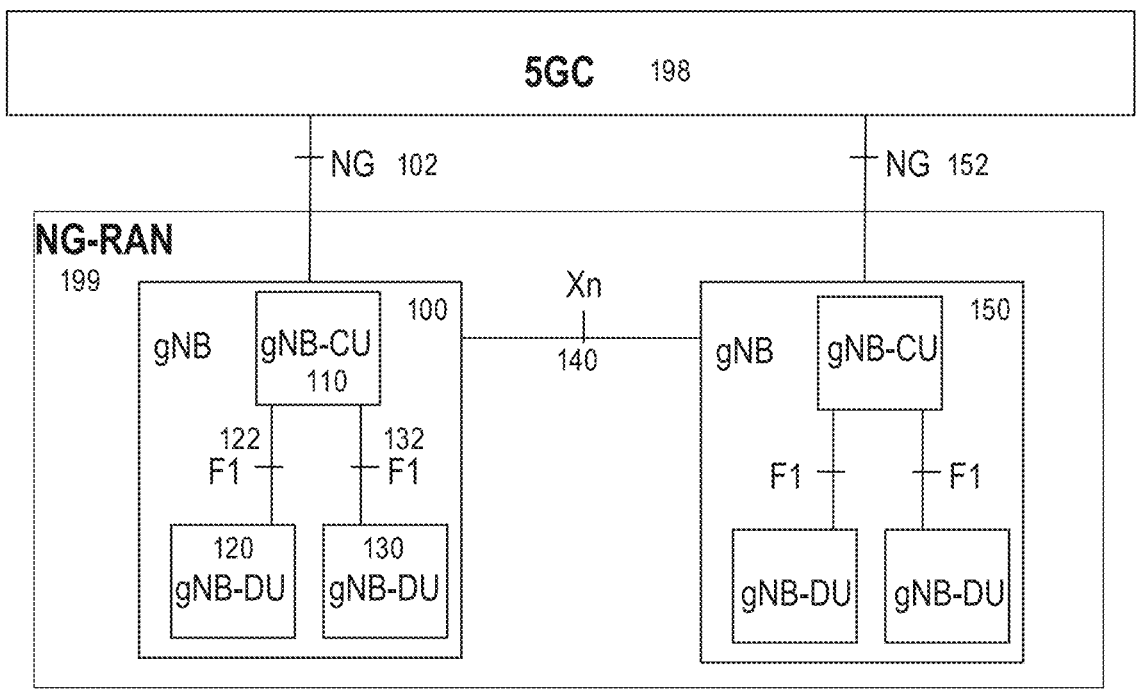
FIG. 1 illustrates a high-level view of the 5G network architecture, including a Next Generation radio access network (NG-RAN) and a 5G core (5GC) network.
Figure 2:
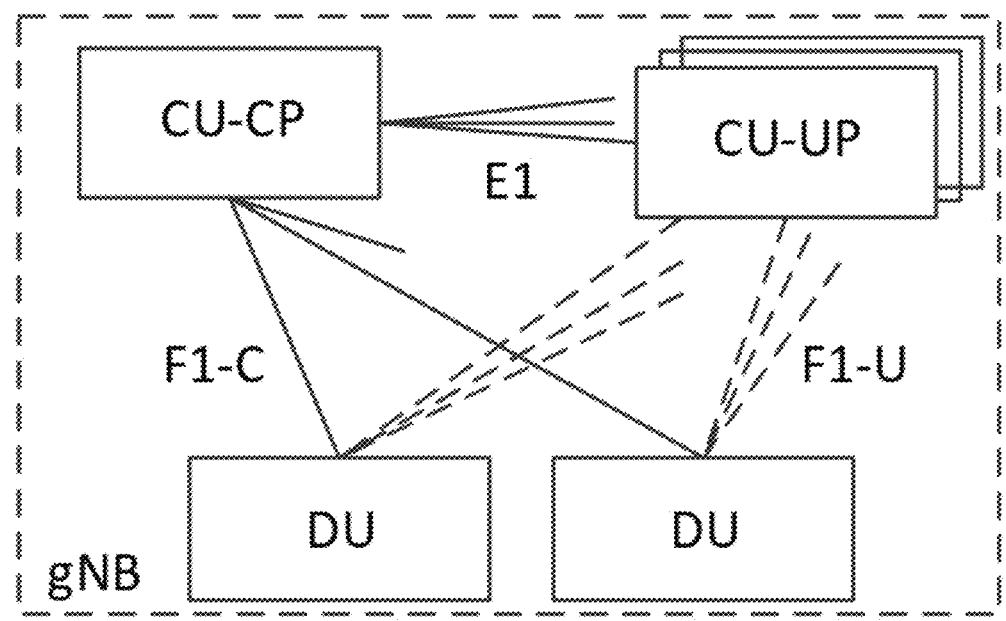
FIG. 2 illustrates interfaces within an NG-RAN node (e.g., gNB) that support control plane (CP) and user plane (UP) functionality.
Figure 3:
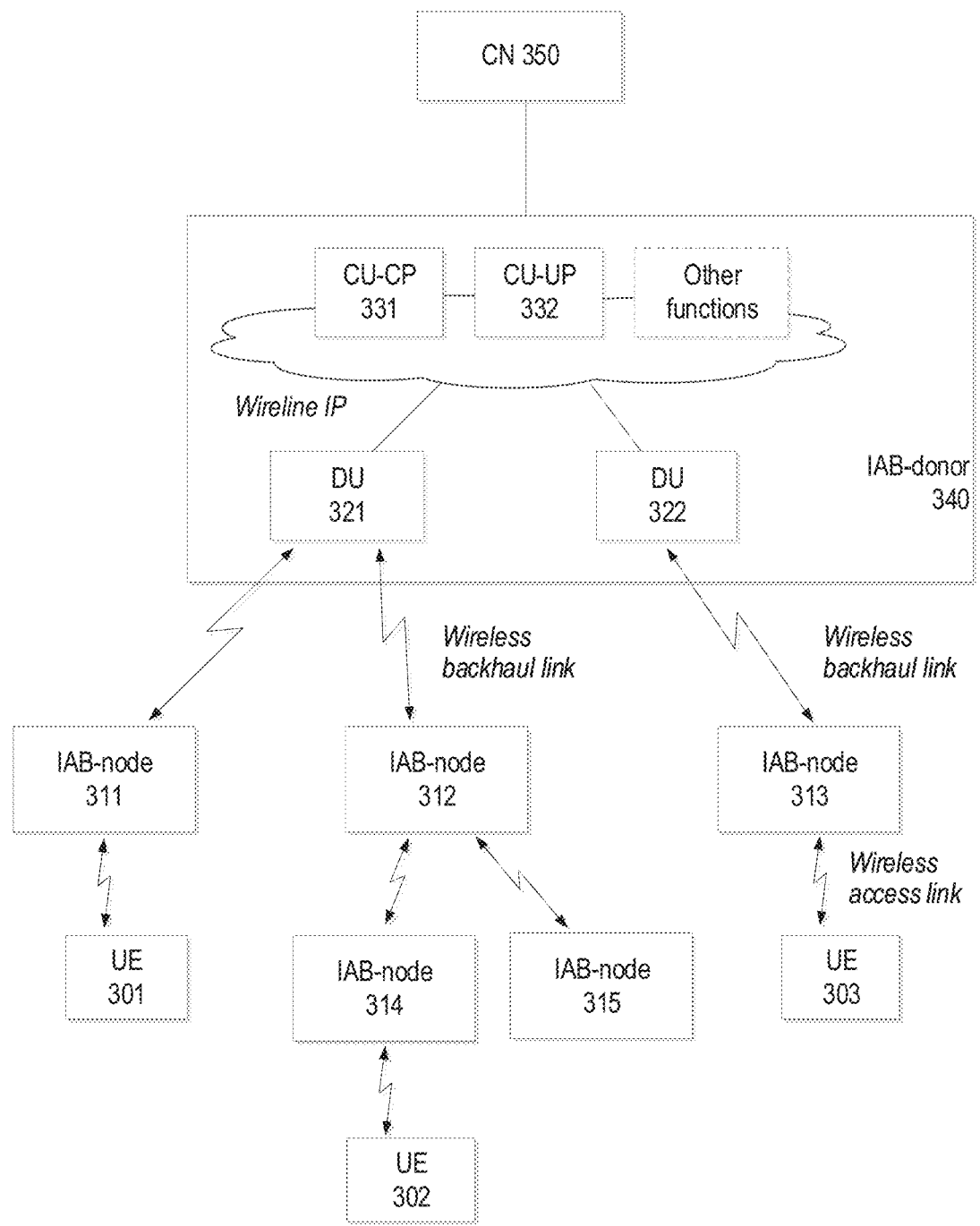
FIG. 3 shows a reference diagram for an integrated access backhaul (IAB) network in standalone mode.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

Radio Node: As used herein, a "radio node" can be either a "radio access node" or a "wireless device."

Radio Access Node: As used herein, a "radio access node" (or alternately "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

Figures 4, 5:
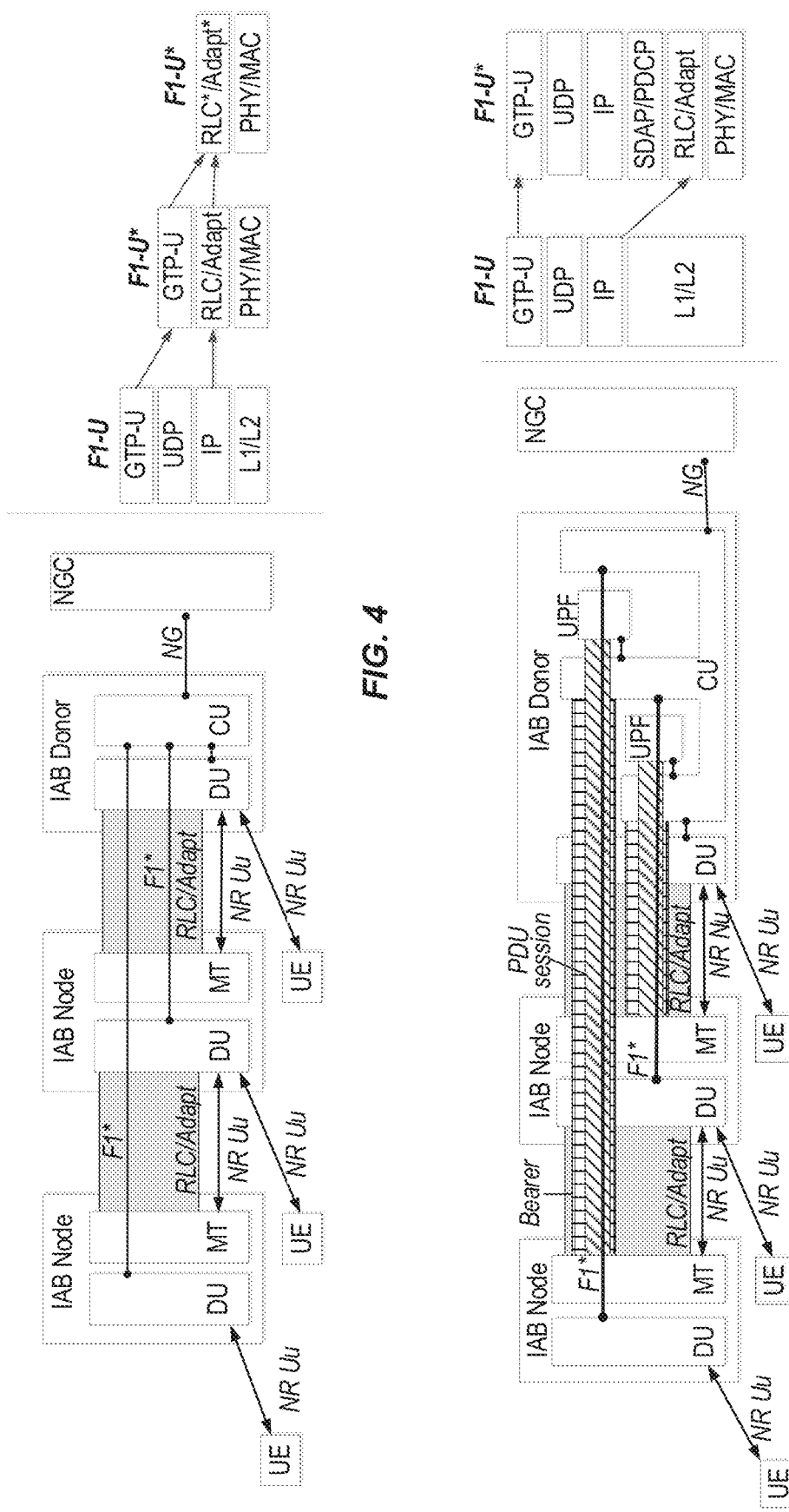
FIGS. 4-5 show block diagrams of two different IAB reference architectures, i.e., architectures "1a" and "1b" as specified in 3GPP TR 38.874 (version 0.2.1).

3GPP TR 38.874 (version 0.2.1) specifies several reference architectures for supporting user plane traffic over IAB nodes, including IAB Donor nodes. FIG. 4 shows a block diagram of reference architecture "1a", which leverages the CU/DU split architecture in a two-hop chain of IAB nodes underneath an IAB-donor.

In this architecture, each IAB node holds a DU and an MT. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*. Whether an IAB node can connect to more than one upstream IAB-node or IAB-donor is for further study.

The IAB Donor also includes a DU to support UEs and MTs of downstream IAB nodes. The IAB-donor holds a CU for the DUs of all IAB-nodes and for its own DU. It is for further study (FFS) in 3GPP whether different CUs can serve the DUs of the IAB-nodes. Each DU on an IAB-node connects to the CU in the IAB-donor using a modified form of F1, which is referred to as F1*. F1*-U runs over RLC channels on the wireless backhaul between the MT on the serving IAB-node and the DU on the donor. F1*-U transport between MT and DU on the serving IAB-node as well as between DU and CU on the donor is for further study. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ only on the end-to-end connection opposed to hop-by-hop.

The right side of FIG. 4 shows two examples of such F1*-U protocol stacks. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM. Details of F1*, the adaptation layer, RLC*, hop-by-hop forwarding, and transport of F1-AP are for further study (FFS) in 3GPP. Protocol translation between F1* and F1 in case the IAB-donor is split is also FFS.

FIG. 5 shows a block diagram of an IAB reference architecture "1b", which also leverages the CU/DU split architecture in a two-hop chain of IAB nodes underneath an IAB-donor. The IAB-donor holds one logical CU. In this architecture, each IAB-node and the IAB-donor hold the same functions as in architecture 1a. Also, as in architecture 1a, every backhaul link establishes an RLC-channel, and an adaptation layer is inserted to enable hop-by-hop forwarding of F1*.

In architecture 1b, however, the MT on each IAB-node establishes a PDU-session with a user plane function (UPF) residing on the donor. The MT's PDU-session carries F1* for the collocated DU. In this manner, the PDU-session provides a point-to-point link between CU and DU. On intermediate hops, the PDCP-PDUs of F1* are forwarded via an adaptation layer in the same manner as described for architecture 1a. The right side of FIG. 5 shows an example of the F1*-U protocol stack.

In general, the following discussion relates to control-plane (CP) considerations for IAB architecture group 1. More specifically, a mechanism is needed for protecting F1-AP CP traffic over the wireless backhaul, and four alternatives for architecture 1a are shown in FIGS. 6-9 and discussed in more detail below.

Figure 6A:
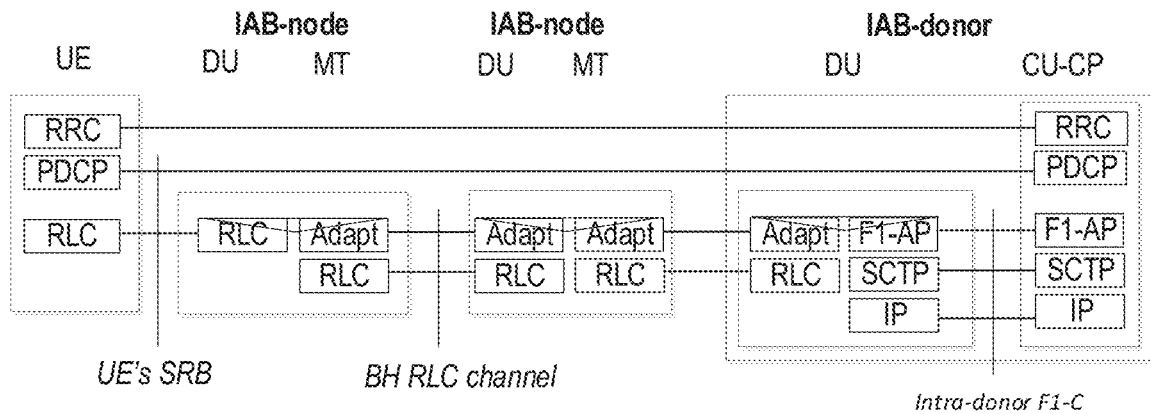
FIGS. 6A-C show exemplary user equipment (UE) radio resource control (RRC), mobile terminal (MT) RRC, and distributed unit (DU) F1-AP protocol stacks, respectively, for a first alternative for architecture "1a" (also referred to as "alternative 1").
Figure 6B:
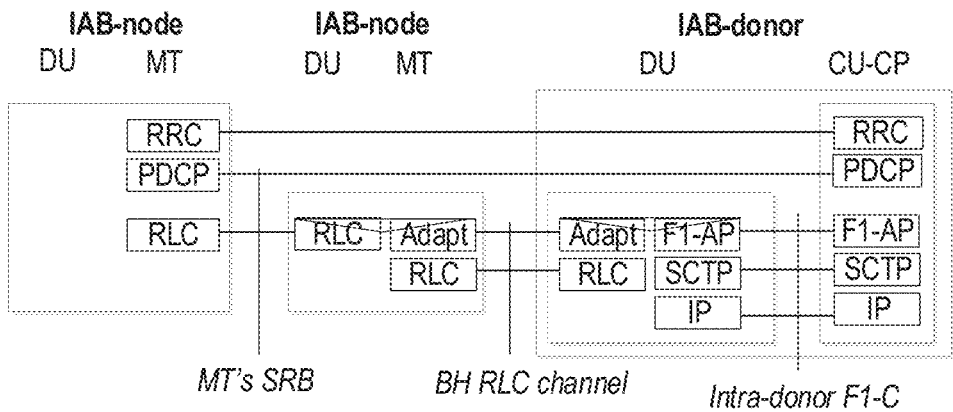
Figure 6C:
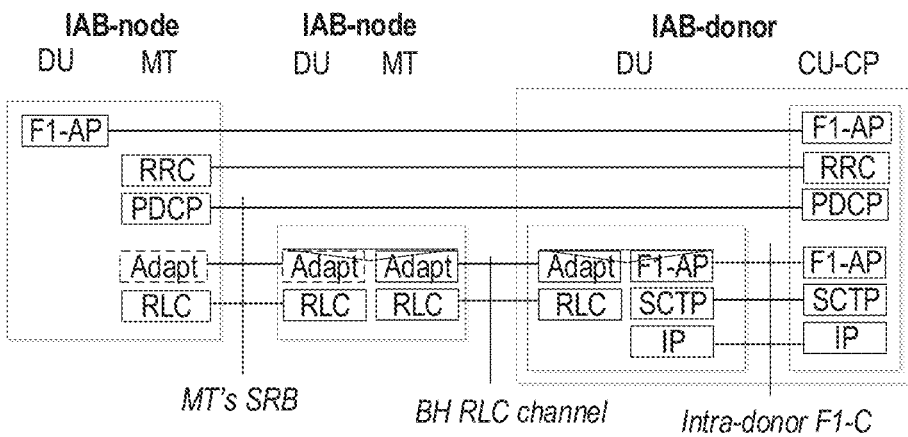

FIGS. 6A-6C show exemplary UE RRC, MT RRC, and DU F1-AP protocol stacks for a first alternative of architecture 1a, also referred to as "alternative 1". In this alternative, the adaptation layer is placed on top of RLC, and RRC connections for UE RRC and MT RRC are carried over a signalling radio bearer (SRB). On the UE's or MT's access link, the SRB uses an RLC-channel.

On the wireless backhaul links, the SRB's PDCP layer is carried over RLC-channels with adaptation layer. The adaptation layer placement in the RLC channel is the same for CP as for UP. The information carried on the adaptation layer may be different for SRB than for data radio bearer (DRB). The DU's F1-AP is encapsulated in RRC of the collocated MT, such that F1-AP is protected by the PDCP of the underlying SRB. Within the IAB-donor, the baseline is to use native F1-C stack.

Figure 7A:
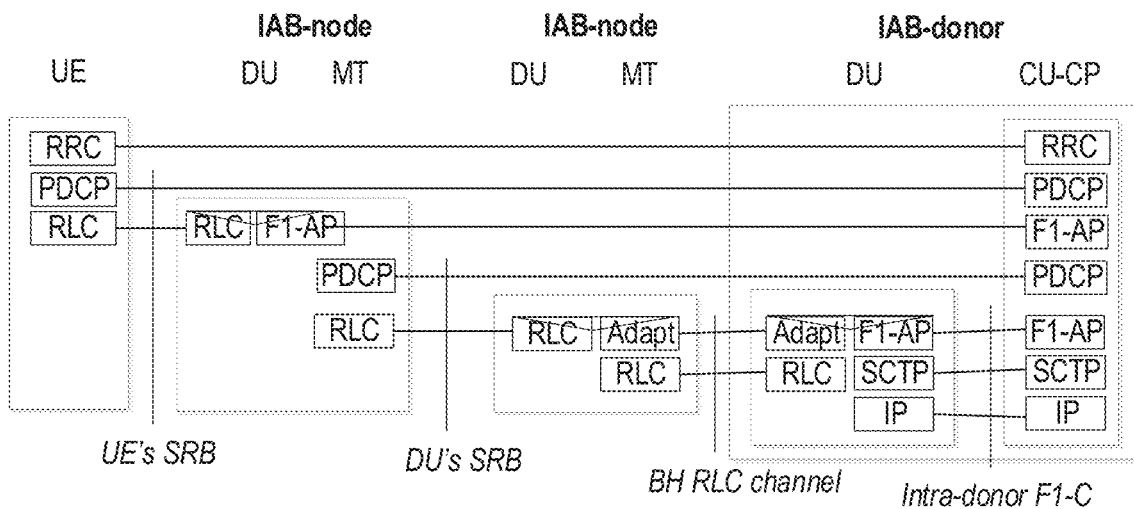
FIGS. 7A-C show exemplary UE RRC, MT RRC, and DU F1-AP protocol stacks, respectively, for a second alternative for architecture "1a" (also referred to as "alternative 2").
Figure 7B:
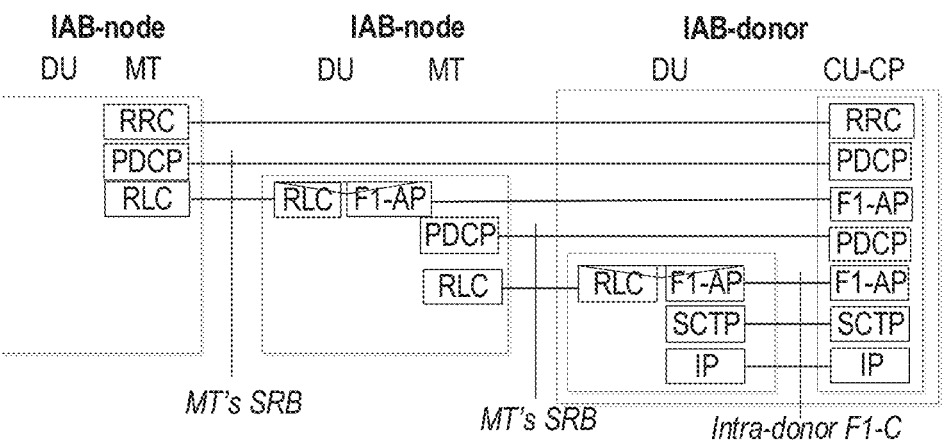
Figure 7C:
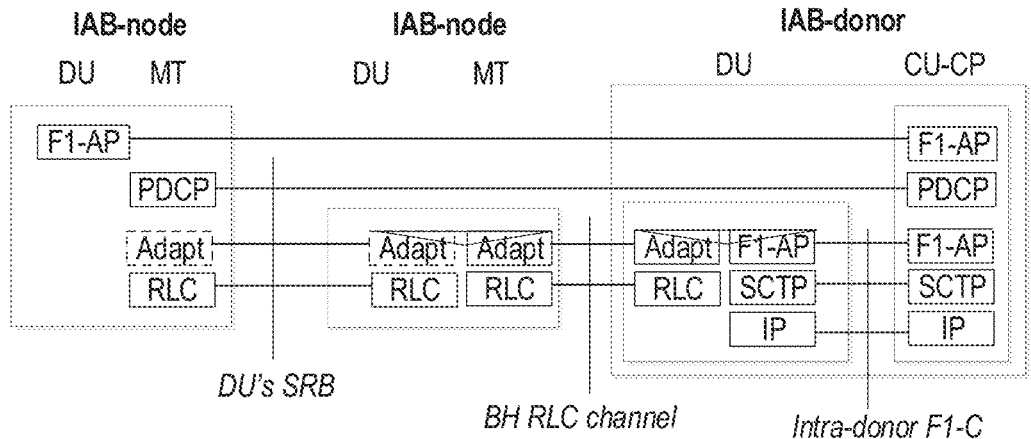

FIGS. 7A-7C show exemplary UE RRC, MT RRC, and DU F1-AP protocol stacks for a second alternative of architecture 1a, also referred to as "alternative 2". Similar to alternative 1, RRC connections for UE RRC and MT RRC are carried over a signalling radio bearer (SRB), and the SRB uses an RLC-channel on the UE's or MT's access link.

In contrast, on the wireless backhaul links, the SRB's PDCP layer is encapsulated into F1-AP. The DU's F1-AP is carried over an SRB of the collocated MT. F1-AP is protected by this SRB's PDCP. On the wireless backhaul links, the PDCP of the F1-AP's SRB is carried over RLC-channels with adaptation layer. The adaptation layer placement in the RLC channel is the same for CP as for UP. The information carried on the adaptation layer may be different for SRB than for DRB. Within the IAB-donor, the baseline is to use native F1-C stack.

Figure 8A:
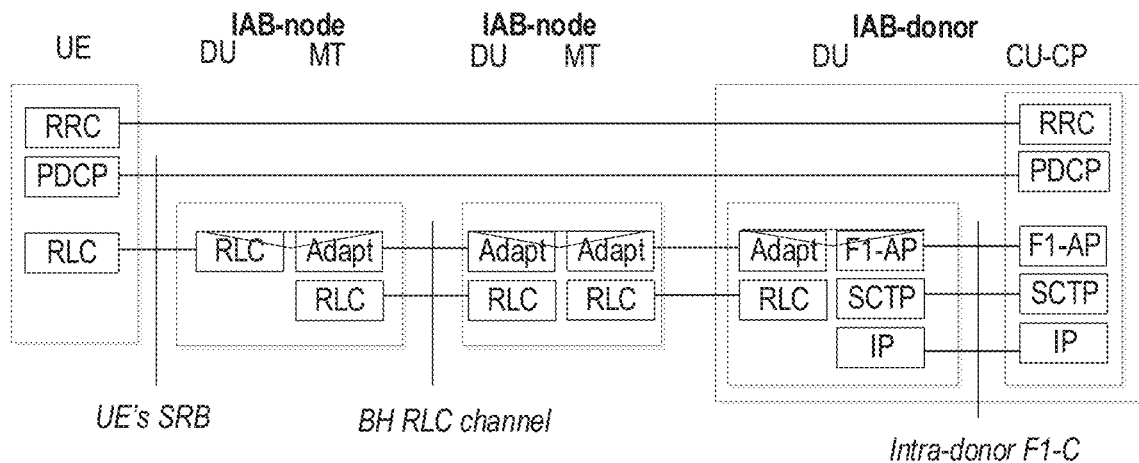
FIGS. 8A-C show exemplary UE RRC, MT RRC, and DU F1-AP protocol stacks, respectively, for a third alternative for architecture "1a" (also referred to as "alternative 3").
Figure 8B:
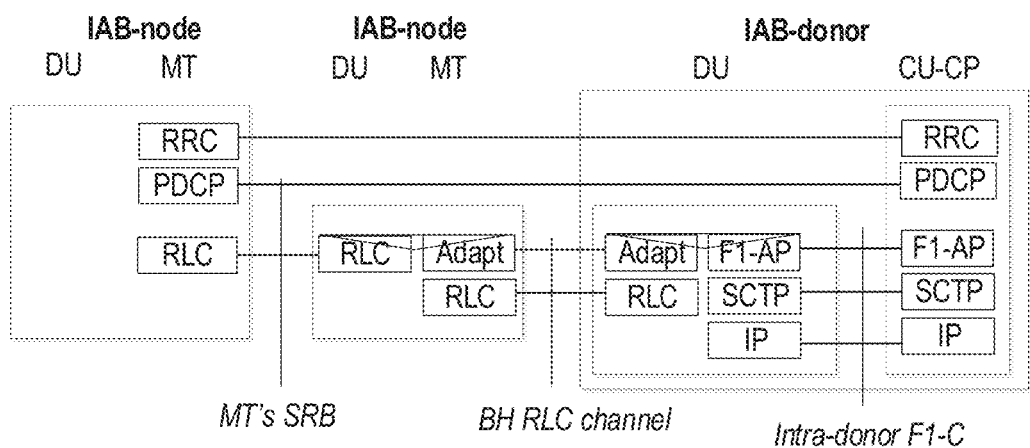
Figure 8C:
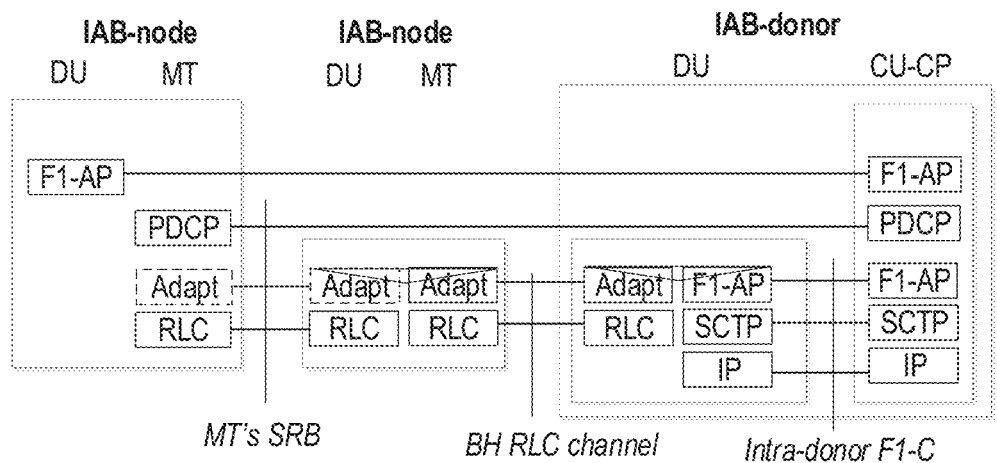

FIGS. 8A-8C show exemplary UE RRC, MT RRC, and DU F1-AP protocol stacks for a third alternative, also referred to as "alternative 3". In this alternative, the adaptation layer is placed on top of RLC, and RRC connections for UE and MT are carried over a signalling radio bearer (SRB). On the UE's or MT's access link, the SRB uses an RLC-channel. On the wireless backhaul links, the SRB's PDCP layer is carried over RLC-channels with adaptation layer. The adaptation layer placement in the RLC channel is the same for CP as for UP. The information carried on the adaptation layer may be different for SRB than for data radio bearer (DRB). The DU's F1-AP is also carried over an SRB of the collocated MT. F1-AP is therefore protected by the PDCP of this SRB. On the wireless backhaul links, the PDCP of the this SRB is also carried over RLC-channels with adaptation layer. Within the IAB-donor, the baseline is to use native F1-C stack.

Figure 9A:
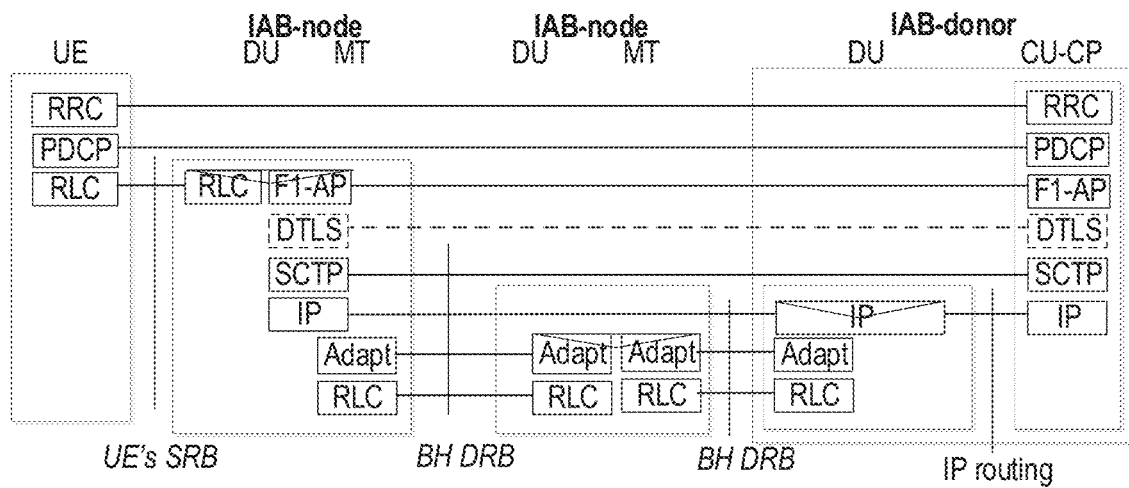
FIGS. 9A-C show exemplary UE RRC, MT RRC, and DU F1-AP protocol stacks, respectively, for a fourth alternative for architecture "1a" (also referred to as "alternative 4").
Figure 9B:
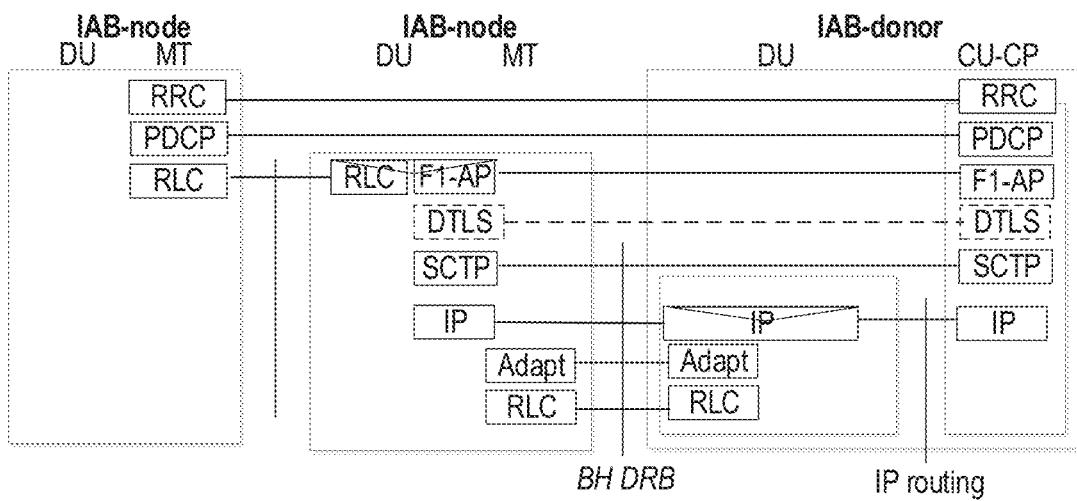
Figure 9C:
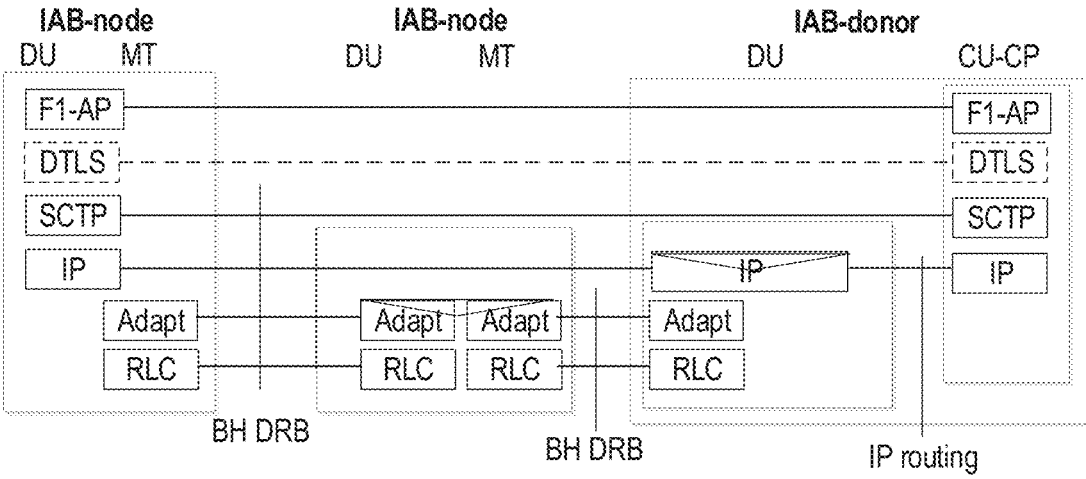

FIGS. 9A-9C show exemplary UE RRC, MT RRC, and DU F1-AP protocol stacks for a fourth alternative, also referred to as "alternative 4". In this alternative, the adaptation layer is placed on top of RLC, and all F1-AP signalling is carried over SCTP/IP to the target node. The IAB-donor maps DL packets based on target node IP to adaptation layer used on backhaul DRB. Separate backhaul DRBs can be used to carry F1-AP signalling from F1-U related content. For example, mapping to backhaul DRBs can be based on target node IP address and IP layer Diffsery Code Points (DSCP) supported over F1 as specified in 3GPP TS 38.474 (version 15.1.0).

In alternative 4, a DU will also forward other IP traffic to the IAB node (e.g., OAM interfaces). The IAB node terminates the same interfaces as a normal DU except that the L2/L1 protocols are replaced by adaptation/RLC/MAC/PHY-layer protocols. F1-AP and other signalling are protected using NDS (e.g., IPSec, DTLS over SCTP) operating in the conventional way between DU and CU. For example, SA3 has adopted DTLS over SCTP (as specified in IETF RFC6083) for protecting F1-AP.

In addition to the CP considerations discussed above, there are various user plane (UP) considerations for architecture group 1 (i.e., architectures 1a and 1b) including placement of an adaptation layer (including whether the adaptation layer is also included in IAB-node access links), functions supported by the adaptation layer, support of multi-hop RLC, impacts on scheduler and QoS. These are illustrated by exemplary protocol stacks for architectures 1a and 1b shown in FIGS. 10 and 11, respectively.

More specifically, FIGS. 10A-E illustrate exemplary UP protocol arrangements for architecture 1a, with each arrangement corresponding to a different placement of the adaptation layer. Furthermore, each arrangement shows protocol stacks for UE, the UE's access IAB node, an intermediate IAB node, and the IAB donor DU/CU. FIG. 10 illustrates an exemplary user-plane protocol stack arrangement for architecture 1b, also including protocol stacks for UE, the UE's access IAB node, and intermediate IAB node, and the IAB donor DU/CU. Even so, FIGS. 10-11 only show exemplary protocol stacks and do not preclude other possibilities.

The UE establishes RLC channels to the DU on the UE's access IAB node in compliance with 3GPP TS 38.300 (v15.2.0). Each of these RLC channels is extended via a potentially modified form of F1-U, referred to as F1*-U, between the UE's access DU and the IAB donor. The information embedded in F1*-U is carried over RLC channels across the backhaul links. Transport of F1*-U over the wireless backhaul is enabled by an adaptation layer, which is integrated with the RLC channel Within the IAB-donor (referred to as fronthaul), the baseline is to use native F1-U stack. The IAB-donor DU relays between F1-U on the fronthaul and F1*-U on the wireless backhaul.

In architecture 1a, information carried on the adaptation layer supports the following functions:
  Identification of the UE-bearer for the PDU,
  Routing across the wireless backhaul topology,
  QoS-enforcement by the scheduler on DL and UL on the wireless backhaul link,
  Mapping of UE user-plane PDUs to backhaul RLC channels,
  Others.
Similarly, in architecture 1b, information carried on the adaptation layer supports the following functions:
  Routing across the wireless backhaul topology,
  QoS-enforcement by the scheduler on DL and UL on the wireless backhaul link,
  Mapping of UE user-plane PDUs to backhaul RLC channels
  Others.
Information to be carried on the adaptation layer header may include:
  UE-bearer-specific Id
  UE-specific Id
  Route Id, IAB-node or IAB-donor address
  QoS information
  Potentially other information IAB nodes can use the identifiers carried via the adaptation layer to ensure required QoS treatment and to decide which hop a packet should be sent to. Although details of the information carried in the adaptation layer are FFS in 3GPP, a brief overview is provided below on how the above information may be used to this end, if included in the final design of the adaptation layer.

The UE-bearer-specific ID may be used by the IAB-node and the IAB-donor to identify a PDU's UE-bearer. A UE's access IAB node would then map adaptation-layer information (e.g. UE-specific ID, UE-bearer specific ID) into the corresponding cell radio network temporary identifier (C-RNTI) and logical channel ID (LCID). The IAB Donor DU may also need to map adaptation-layer information into the F1-U GTP-U TEID used between Donor DU and Donor CU.

UE-bearer-specific Id, UE-specific Id, Route Id, or IAB-node/IAB-donor address may be used (e.g., in combination or individually) to route the PDU across the wireless backhaul topology. UE-bearer-specific Id, UE-specific Id, UE's access node IAB ID, or QoS information may be used (in combination or individually) on each hop to identify the PDU's QoS treatment. The PDU's QoS treatment may also be based on the LCID. Various information on the adaptation layer is processed to support the above functions on each on-path IAB-node (hop-by-hop), and/or on the UE's access-IAB-node and the IAB-donor (end-to-end).

Figure 10A:
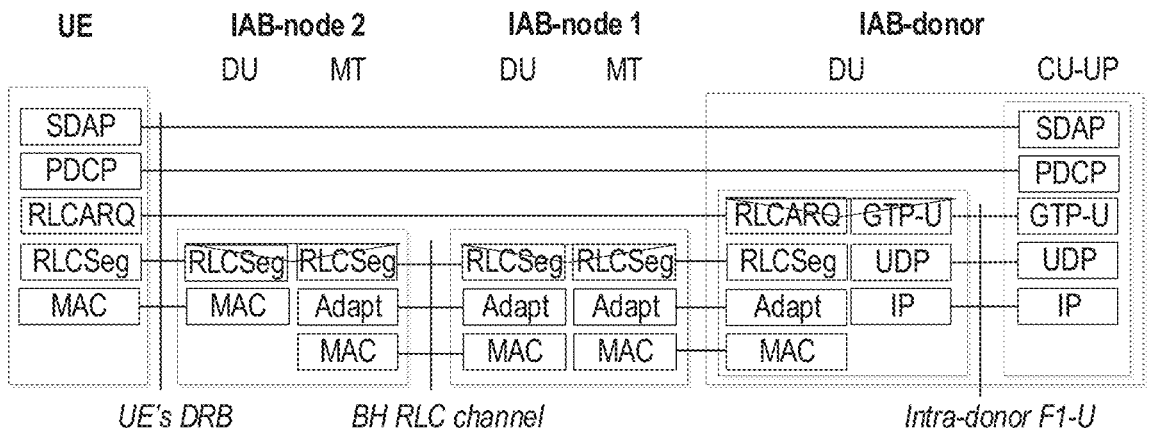
FIGS. 10A-E illustrate exemplary user-plane (UP) protocol stack arrangements for architecture "1a," including various placements of an adaptation layer.
Figure 10B:
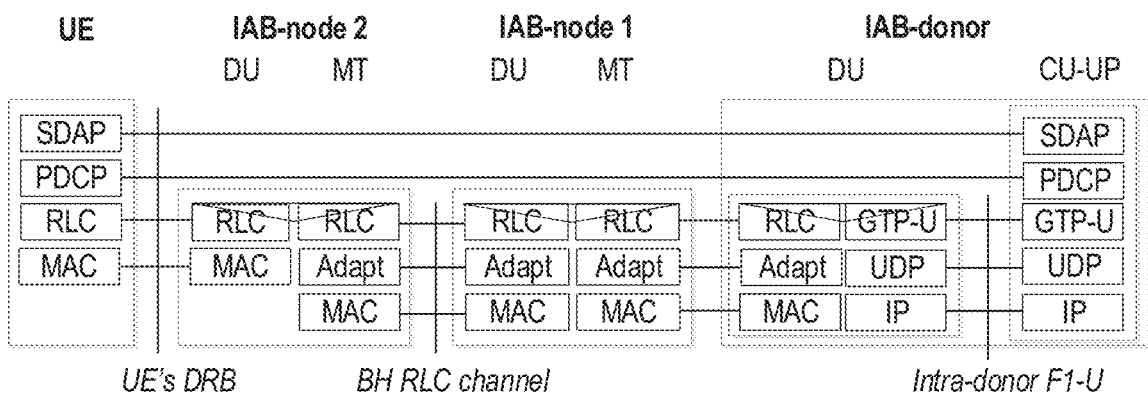
Figure 10C:
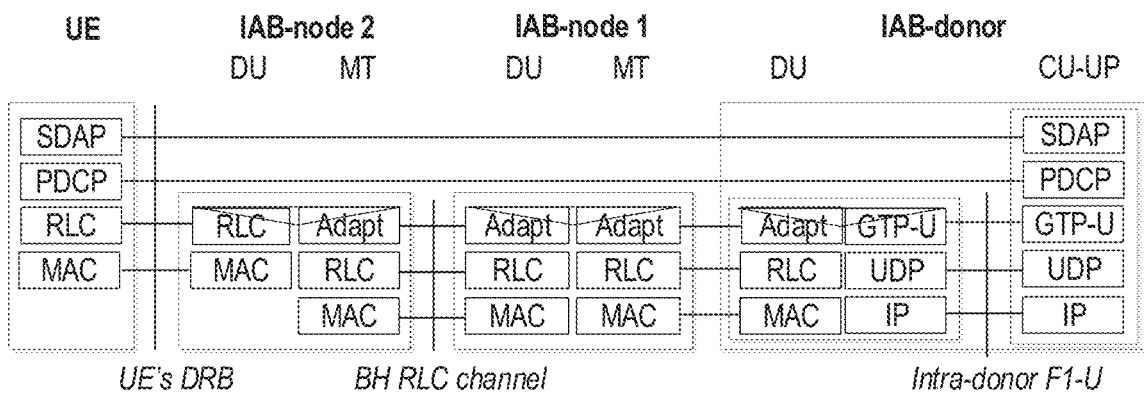
Figure 10D:
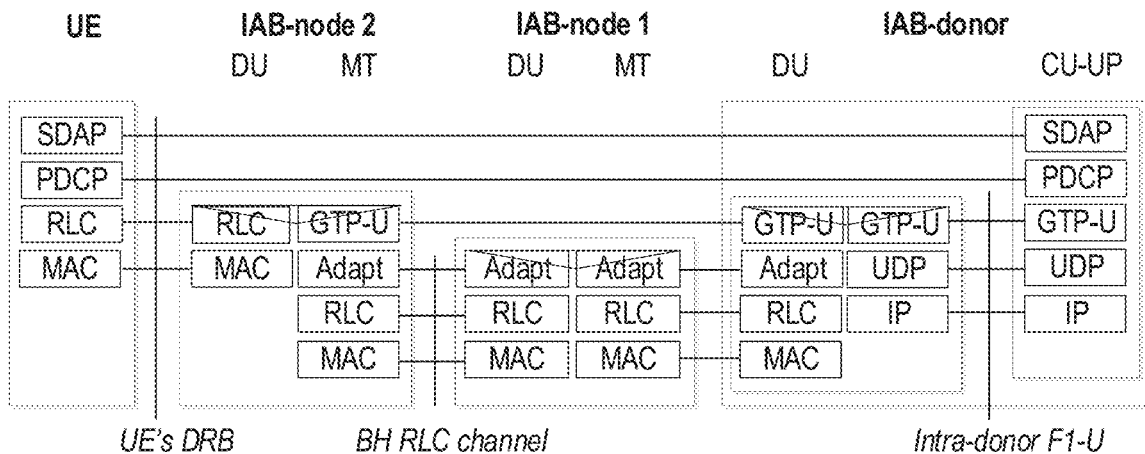

Various options are available for placement of the adaptation layer into the L2 stack. For example, the adaptation layer can be integrated with, or placed above, the MAC layer but below the RLC layer. FIGS. 10A-B show two options for placement of the adaptation layer above MAC and below RLC. Alternately, the adaptation layer can be placed above RLC. Several examples of this alternative are shown in FIGS. 10C-E and FIG. 11.

For one-to-one mapping of UE-bearers to backhaul RLC-channel, the adaptation layer should be integrated with the MAC layer or placed above the MAC layer. A separate RLC-entity in each IAB node can be provided for each of these backhaul RLC-channels. Arriving PDUs can be mapped to the corresponding RLC-entity based on the UE-bearer information carried by the adaptation layer. When UE-bearers are aggregated to backhaul RLC-channels (e.g., based on QoS-profile), the adaptation layer can be placed above the RLC layer. For both of these options, when UE bearers are aggregated to logical channels, the logical channel can be associated to a QoS profile. The number of QoS-profiles supported is limited by the LCID-space.

The adaptation layer may consist of sublayers. It is conceivable, for example, that the GTP-U header becomes a part of the adaptation layer. It is also possible that the GTP-U header is carried on top of the adaptation layer (e.g., as shown in FIG. 10D) to carry end-to-end association between the IAB-node DU and the CU.

Figure 10E:
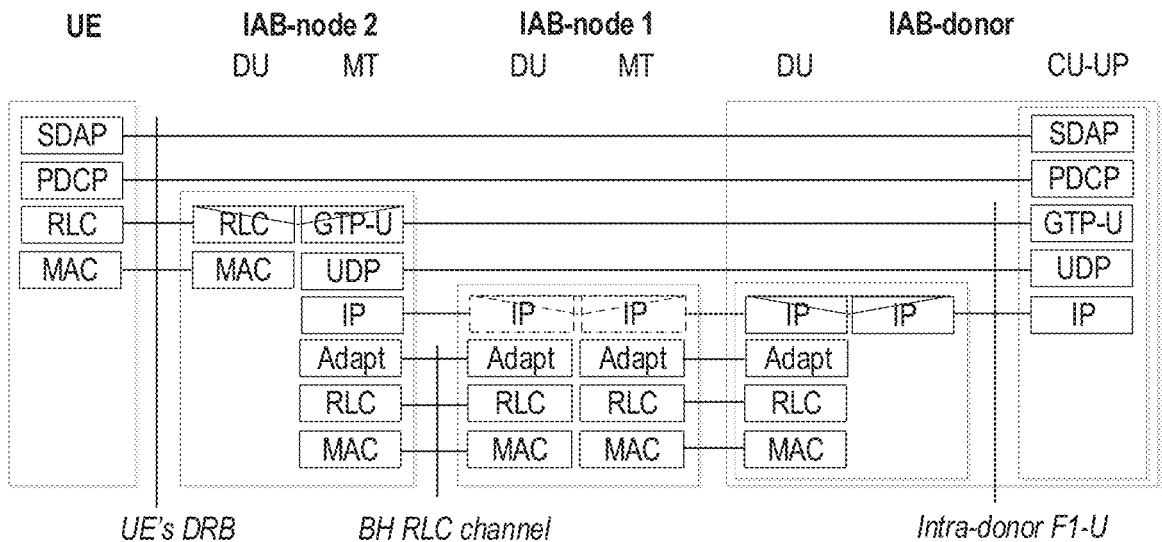
Figure 11:
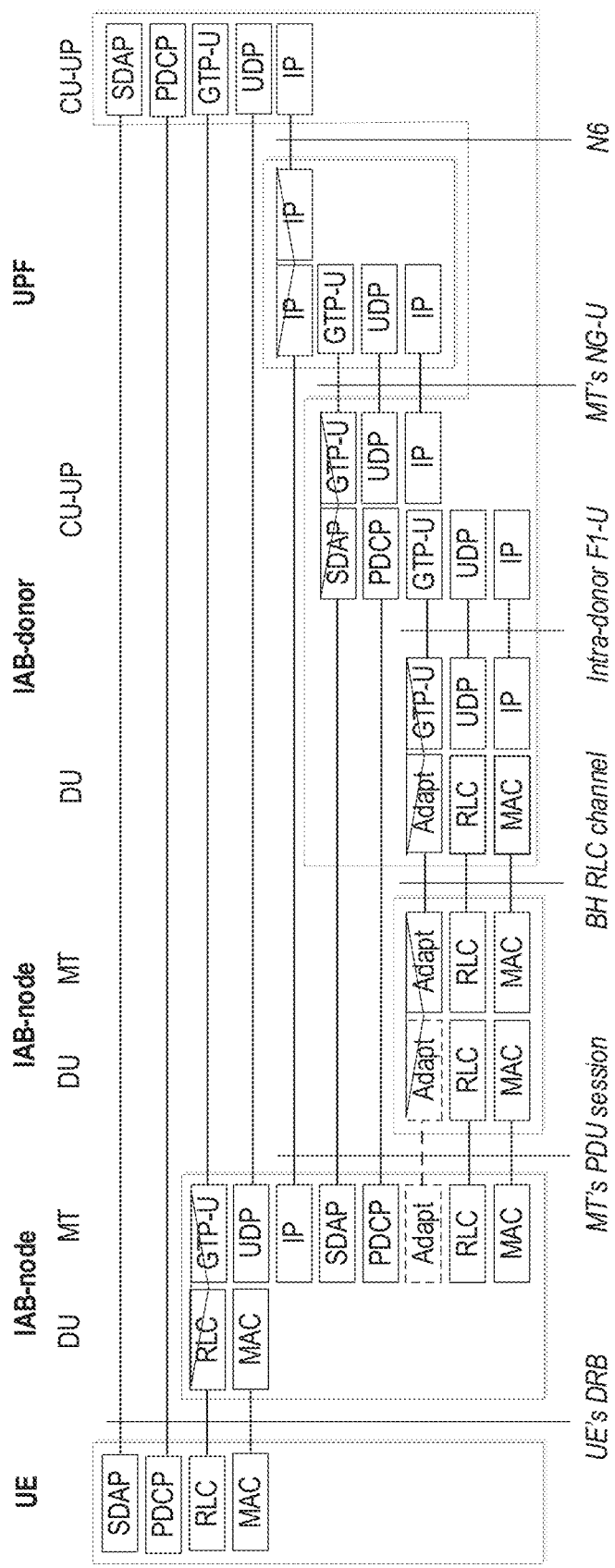
FIG. 11 illustrates an exemplary UP protocol stack arrangement for architecture "1b."

Alternatively, an IP header may be part of the adaptation layer or carried on top of the adaptation layer, such as shown in FIG. 10E. In this example, the IAB-donor DU holds an IP routing function to extend the IP-routing plane of the fronthaul to the IP-layer carried by adapt on the wireless backhaul. This allows native F1-U to be established end-to-end, i.e. between IAB-node DUs and IAB-donor CU-UP. The scenario implies that each IAB-node holds an IP-address, which is routable from the fronthaul via the IAB-donor DU. The IAB-nodes' IP addresses may further be used for routing on the wireless backhaul. Note that the IP layer on top of the adaptation layer does not represent a PDU session. As such, the MT's first hop router on this IP layer does not have to hold a UPF.

Various other aspects and/or issues can also impact the placement of the adaptation layer. For example, an above-RLC adaptation layer can only support hop-by-hop ARQ. The above-MAC adaptation layer can support both hop-by-hop and end-to-end ARQ. On the other hand, both adaptation layer placements can support aggregated routing (e.g., by inserting an IAB-node address into the adaptation header) and both adaptation layer placements can support per-UE-bearer QoS treatment. In order for each UE bearer to receive individual QoS support when their number exceeds the size of the LCID space, the LCID space might be extended, e.g., by changes to the MAC sub-header or by dedicated information placed in the adaptation layer header. It is to be determined whether eight groups for uplink BSR reporting is sufficient, or whether the scheduling node has to possess better knowledge of which DRB has uplink data.

It is possible that the UE-specific ID, if used, will be a completely new identifier; alternatively, one of the existing identifiers can be reused. The identifiers included in the adaptation layer header may vary, depending on the adaptation layer placement. For above-RLC adaptation layer, the LCID space has to be enhanced since each UE-bearer is mapped to an independent logical channel. For above-MAC adaptation layer, UE-bearer-related info has to be carried on the adaptation header.

In addition, both adaptation layer placements can support aggregated QoS handling, in the following example network configurations: (a) For above-RLC adaptation layer placement, UE bearers with the same QoS profile could be aggregated to one backhaul RLC channel for this purpose; (b) for above-MAC or integrated-with-MAC adaptation layer, UE bearers with the same QoS profile could be treated with the same priority by the scheduler. In addition, for both adaptation layer placements, aggregation of routing and QoS handling allows proactive configuration of intermediate on-path IAB-nodes, i.e., configuration is independent of UE-bearer establishment/release. Likewise, for both adaptation layer placements, RLC ARQ can be pre-processed on TX side.

For RLC AM, ARQ can be conducted hop-by-hop along access and backhaul links, such as illustrated in FIGS. 6C-6E and FIG. 7. It is also possible to support ARQ end-to-end between UE and IAB-donor, such as illustrated in FIGS. 6A-6B. Since RLC segmentation is a just-in-time process it is always conducted in a hop-by-hop manner. For end-to-end multi-hop RLC ARQ, the adaptation layer should be integrated with, or placed above, MAC layer. In contrast, there is dependence between adaptation and MAC layers for multi-hop RLC ARQ conducted hop-by-hop.

Table 1 below provides a summary comparison between end-to-end and hop-by-hop RLC ARQ.

For example, there are eight (8) buffers in a UE MAC entity, each of which can store data/traffic for a group of logical channels (called a Logical Channel Group or "LCG" for short) depending on the mapping configuration. The mapping of a logical channel to an LCG is done when the logical channel is setup by gNB, which may be based on a quality-of-service (QoS) profile of the logical channel. Responding to a BSR, the network (gNB) may grant UL radio resources to the UE for transmitting the queued data. The radio resource granted to the UE may be used to transmit data from one or more logical channel depending on the priorities of the logical channels.

There are three types of BSR: Regular BSR, Periodic BSR, and Padding BSR, each one has different triggering conditions. As specified in 3GPP TS 38.321, tor each of the BSR types, a BSR is triggered if any of the following events occur:

Regular BSR: the MAC entity has new UL data available for a logical channel which belongs to an LCG; and either:

The new UL data belongs to a logical channel with higher priority than the priority of any logical channel containing available UL data which belong to any LCG; or

TABLE 1

| Metric | Hop-by-hop RLC ARQ | End-to-end RLC ARQ |
|---|---|---|
| Forwarding latency | Potentially higher as packets have to pass through RLC-state machine on each hop. | Potentially lower as packets do not go through the RLC state machine on intermediate IAB-nodes. |
| Latency due to retransmission | Independent of number of hops | Increases with number of hops |
| Capacity | Packet loss requires retransmission only on one link. Avoids redundant retrans-mission of packets over links where the packet has already been successfully transmitted. | Packet loss may imply retransmission on multiple links, including those where the packet was already success-fully transmitted. |
| Hop count limitation due to RLC parameters | Hop count is not affected by max window size. | Hop count may be limited by the end-to-end RLC latency due to max window size. |
| Hop count limitation due to PCDP parameters | Hop count may be limited by increasing disorder of PDCP PDUs over sequential RLC ARQ hops. This may increase probability to exceed max PDCP window size. | Hop count does not impact disorder of PDCP PDUs due to RLC ARQ. |
| Processing and memory impact on intermediate IAB-nodes | Larger since processing and memory can be required on intermediate IAB-nodes. | Smaller since intermediate path-nodes do not need ARQ state machine and flow window. |
| RLC specification impact | No stage-3 impact expected | Potential stage-3 impact |
| Operational impact for IAB-node to IAB-donor upgrades | IAB-nodes and IAB-donors use the same hop-by-hop RLC ARQ. As a result, this functionality is completely unaffected by the upgrade of IAB-node to IAB-donor at availability of fiber, potentially reducing the effort required to confirm proper operation. | End-to-end RLC ARQ results in a greater architectural difference between IAB nodes vs. IAB donor nodes. As a result, additional effort can be required to complete an upgrade of an IAB node to an IAB donor upon availability of fiber. |
| Configuration complexity | RLC timers are not dependent on hop-count. | RLC timers become hop-count dependent. |

As briefly discussed above, Buffer Status Reports (BSRs) are used in NR for requesting UL-SCH resources from the network when a UE needs to send new data. Various BSR mechanisms have been defined for NR. Even so, there can be various issues and/or problems that occur when applying conventional BSR mechanisms in an IAB network that can include several IAB nodes between a donor DU and a UE. These are discussed below in more detail.

The logical channels belonging to an LCG contain no available UL data.

Padding BSR: UL resources are allocated and number of padding bits is equal to or larger than the size of the BSR MAC CE plus its sub-header Periodic BSR: triggered periodically based on a timer called periodicBSR-Timer.

The Buffer Size field in a BSR indicates the total amount of data available (calculated as specified in 3GPP TS 38.322 (v15.x.x) and 3GPP TS 38.323 (v15.x.x)) across all logical channels of an LCG after the MAC PDU has been built (i.e., after the logical channel prioritization procedure.

Note that BSRs can be sent only if data is already being transmitted on a link, which will likely occur on the links between the IAB nodes since they aggregate data of several UEs. If not, a scheduling request (SR) must be sent before a BSR can be sent, leading to even longer end-to-end latency. Furthermore, sending a BSR requires a resource grant for transmission and it may be necessary to send a SR to get the required resources if the UE (or MT part of the IAB node) already doesn't have a grant. Nevertheless, the following description assumes that resources are already available (e.g., granted) and BSRs can be sent as needed using the available resources.

Figure 12:
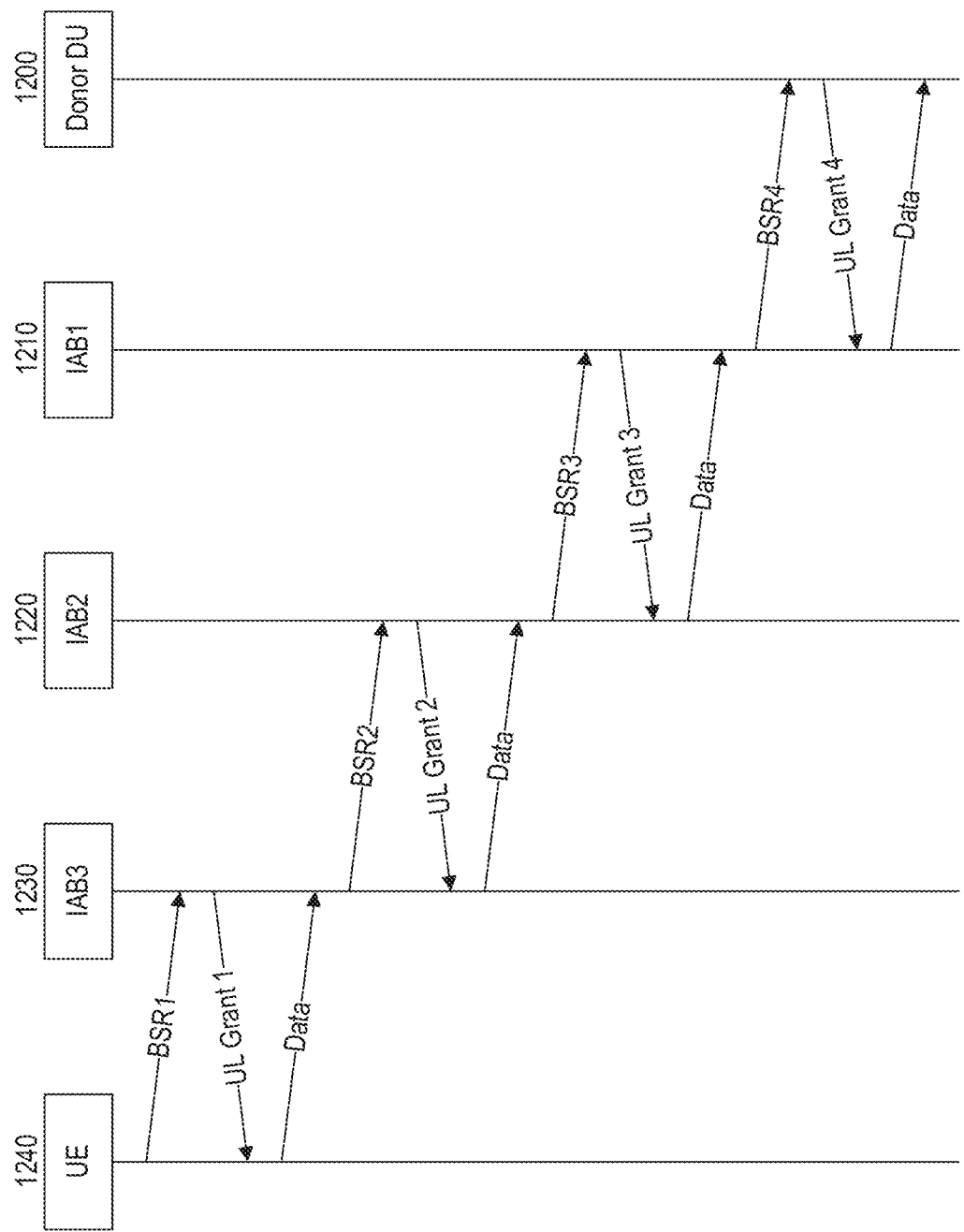
FIGS. 12-13 show signal flow diagrams for two exemplary uplink (UL) scheduling mechanisms in a multi-hop IAB network.

FIG. 12 shows a signal flow diagram for exemplary uplink (UL) scheduling in a multi-hop IAB network. The network includes IAB3 (1230), IAB2 (1220), IAB1 (1210), and a donor DU (1200), with a UE (1240) communicating with IAB3. In the scenario shown in FIG. 12, a BSR is triggered by IAB3 when a new data arrives in the MAC entity of IAB3's MT part, and similar behavior is followed by the other IAB nodes in the UL direction. Since the DU and MT parts and/or modules of an IAB node are generally independent, there some likelihood that an IAB DU may grant more radio resources on the downstream link than its collocated MT receives at the upstream link from the parent node. This can be caused, for example, by factors including varying radio conditions at the two links and the loading of the IAB nodes. This resource disparity can result in buffer buildup and possibly packet drops if the disparity persists.

Figure 13:
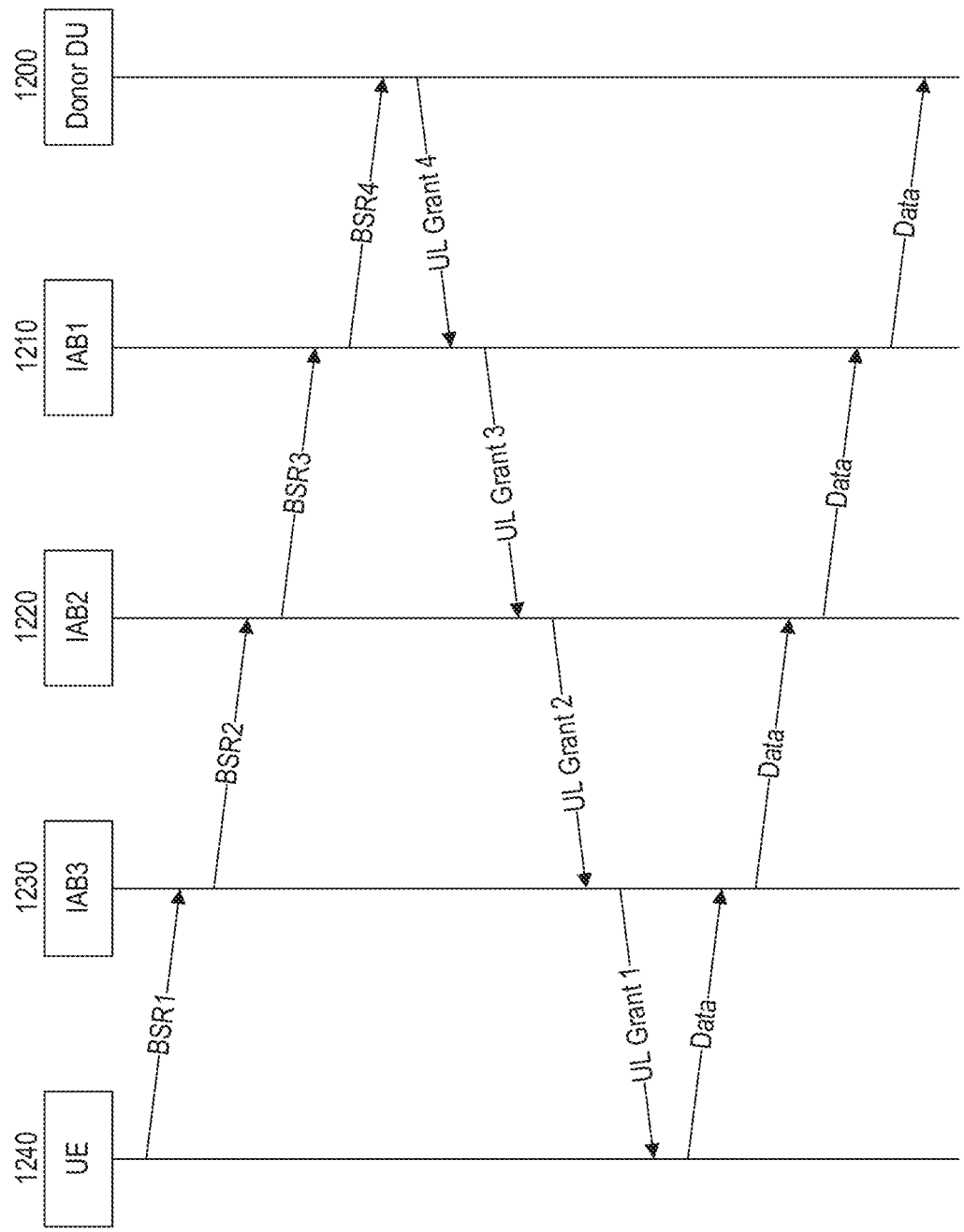

Furthermore, the cascade of scheduling requests and grants across multiple IAB hops can increase the end-to-end latency to a level not acceptable for certain bearers. FIG. 13 shows another signal flow diagram for exemplary uplink (UL) scheduling in a multi-hop IAB network. For sake of clarity, the elements shown in FIG. 13 are given the same reference numbers as the corresponding elements shown in FIG. 12.

In the scenario shown in FIG. 13, each IAB node grants radio resources to a child node only when the IAB node receives resources from its parent node. As such, there will be no UL buffer overflow problem. End-to-end latency can be relatively large, however, and there is a risk that the UL grant provided to a particular IAB node may have expired by the time the data arrives at that node. For example, there can be a significant delay between when IAB1 receives its UL grant from the donor DU and when IAB1 receives the UL data from IAB2.

Embodiments of the present disclosure address these and other problems, challenges, and/or issues by providing specific enhancements and/or improvements to buffer-status reporting by IAB nodes in multi-hop IAB networks. In general, exemplary embodiments involve techniques and/or mechanisms for the two modules and/or parts of an IAB node—MT and DU—to coordinate buffer-status reporting in order to avoid uplink flow congestion problem. As a more specific example, BSR triggers can be enhanced so that the MT part of the IAB node can send a BSR even when data has not arrived yet at its buffers. This buffer-status reporting can be based, for example, on a BSR received from a child (or downstream) IAB node or a UE that indicates data is pending in one or more of those nodes. As another example, buffer-status calculation can be improved to include not only the data currently stored at the IAB node's MT buffers, but also on the data anticipated to be arriving soon at the IAB node's MT from child IAB nodes or UEs.

In this manner, embodiments of the present disclosure can reduce buffer buildup at intermediate IAB nodes, thereby reducing the probability of packet drops and reduced service performance. Furthermore, such embodiments can reduce the end-to-end latency on UL data transport, thereby enabling a multi-hop IAB network to support delay-sensitive services (e.g., URLLC).

In some embodiments, resource grants from a parent IAB node and/or to a child IAB node are not for immediate resources, but rather for resources to be used at a later time. This can be facilitated, for example, by enhancing and/or modifying the BSR such that the intermediate nodes know their separation (e.g., in terms of hop count) from the source node that initiated and/or triggered the BSR. For example, a 1-byte counter field can be added to the BSR, where the counter value indicates how far (e.g., in terms of hop count) the source node is from the node receiving the BSR. Subsequently, the intermediate node receiving the BSR can trigger its own BSR using the counter value in the received BSR but incremented by one.

For the example scenario shown in FIG. 13, this counter value in BSR 1, BSR 2, BSR 3, and BSR 4 can be 0, 1, 2, and 3, respectively. Based on these respective BSR counter values, the Donor DU and the intermediate IAB nodes can schedule UL resource grants to provide sufficient time margin (e.g., delay) for the data to arrive at each MT part. In addition, this grant schedule can also be based on when the grant corresponding to these BSRs is received from the parent nodes.

For example, if IAB1 is aware that UL grant 1 was received in response to BSR sent on behalf of a UE/IAB node three hops away, IAB1 can schedule the grant it is sending to IAB2 so that it becomes valid at a time when data associated with the BSR is anticipated to arrive at IAB2. In doing so, IAB1 can take into consideration the time it takes for the intermediate nodes to send grants to their child nodes/UEs as well as the time required for the child nodes/UEs to send the data.

As an alternative embodiment, rather than a counter, BSRs can be enhanced and/or modified to include a time value (e.g., in network system time) indicating when the first intermediate IAB node (e.g., IAB3) received a BSR (e.g., BSR 1). This time value can be included in all subsequent BSRs (e.g., BSR2-4) associated with the initial BSR. Receiving nodes can compare the time value in the received BSRs with current time to estimate a delay, then schedule UL resources for the data associated with the initial BSR based on this estimated delay.

In other embodiments, upon receiving a BSR from a child IAB node or a UE, an IAB node can send a BSR to its parent node (e.g., IAB node or donor DU) but grants UL resources to the child IAB node (or UE) before receiving the UL resource grant from the parent node. FIGS. 14-15 show signal flow diagrams for exemplary uplink (UL) scheduling in a multi-hop IAB network, according to these embodiments. For sake of clarity, the elements shown in FIGS. 14-15 are given the same reference numbers as the corresponding elements shown in FIGS. 12-13. But compared to arrangements where the IAB node waits to provide UL resource grants (e.g., FIG. 13), the arrangements shown in FIGS. 14-15 provide reduced end-to-end latency.

In the embodiment illustrated by FIG. 14, the IAB node receiving a BSR grants UL resources to its child IAB node (or UE) after sending a corresponding BSR to the parent node. For example, sending the corresponding BSR can be triggered by receiving the BSR from the child IAB node (or UE), similar to the arrangement shown in FIG. 13.

In the embodiment illustrated by FIG. 15, the IAB node receiving a BSR grants UL resources to its child IAB node (or UE) before sending a corresponding BSR to the parent node. For example, sending the corresponding BSR can be triggered by sending the resource grant to the child node.

In the embodiments described above, the network (e.g. donor DU, CU, etc.) can configure and/or tune various BSR parameters including, e.g., time delay between receiving BSR from child node and triggering BSR to parent IAB node, time delay between triggering BSR to parent IAB and granting radio resources to child node, etc. For example, parameter configurations can be based on factors including, e.g., number of hops in the network, amount of data being reported in the BSRs, LCGs included in the BSRs, etc.

The buffer status information carried by the respective BSRs can be determined according to various embodiments. In addition to data currently stored in its own buffers, an IAB node can take into account the amount of data expected and/or anticipated to be received from child nodes (IAB nodes or UEs) when calculating buffer status information for a BSR to the parent node. The anticipated and/or expected data can be determined based on BSRs received from child nodes, amount of UL resources granted to child nodes, or a combination thereof.

The calculation of the buffer status information based on actual buffered data and anticipated and/or expected data can also be performed according to various embodiments. For example, an IAB node can add actual buffered data with anticipated and/or expected data to generate a total value for the BSR. Alternately, an IAB node can weight the anticipated and/or expected data in this calculation, such as by multiplying it by some weighting factor $\alpha$, where $0<\alpha<1$. The factor $\alpha$ can be fixed or it can be variable. For example, a can depend on how far away (e.g., in terms of number of hops) is the node that generated the original BSR, such that closer nodes are associated with higher $\alpha$.

In some embodiments, since the IAB node can map and/or aggregate logical channels incoming at the DU part to logical channels outgoing at the MT part, it can also map the data in certain LCG(s) indicated in received BSRs to be indicated in other LCG(s) when sending the BSR to its parent node.

In some embodiments, the IAB node can also take into account the amount of free buffer space at its MT part when calculating the buffer status information to report. For example, if there is enough free buffer space, the IAB node can refrain from sending a BSR to the parent, or it can send a BSR that is scaled differently than when the MT part is lacking buffer space, which is an urgent condition that can lead to packet drops if not handled immediately.

BSR enhancements such as reporting of anticipated and/or expected data along with actual buffered data can be specified in various ways in 3GPP specifications. For example, since such enhancements are intended only for MT parts of IAB nodes, they can be specified in a way that does not impact behaviour and/or functionality of a UE. For example, 3GPP TS 38.321 (V15.x.x) can be modified in the manner shown below, where underline is used to indicate additions corresponding to embodiments disclosed herein:
4.5 Buffer Status Reporting
A BSR shall be triggered if any of the following events occur:
  the MAC entity has new UL data available for a logical channel which belongs to an LCG or if the UE is the MT part of an IAB node and the DU part of the IAB node has received a BSR from an IAB node or a UE that it is serving; and either
    the new UL data (or anticipated UL data in the case of IAB) belongs to a logical channel with higher priority than the priority of any logical channel containing available UL data (or anticipated UL data in the case of IAB) which belong to any LCG; or
    none of the logical channels which belong to an LCG contains any available UL data, in which case the BSR is referred below to as 'Regular BSR';

Recall that in the above description of the various embodiments, it was assumed that resources were available (e.g., granted) for BSRs, and that BSRs could be sent as needed using the available resources. In cases where a grant is not available, the reception of a BSR will trigger a scheduling request (SR) to the parent node, which normally will provoke a grant to send the BSR.

The embodiments described above are further illustrated by FIG. 16, which shows a flow diagram of an exemplary method performed by an intermediate IAB node or a donor DU. In other words, various embodiments discussed above are represented as features and/or operations shown in FIG. 16.

More specifically, FIG. 16 illustrates an exemplary method and/or procedure for scheduling uplink (UL) transmissions in an integrated access backhaul (IAB) network, according to various exemplary embodiments of the present disclosure. The exemplary method and/or procedure shown in FIG. 16 can be performed by a first node (e.g., an intermediate IAB node or a donor DU node associated with a base station) in an radio access network (RAN). Although the exemplary method and/or procedure is illustrated in FIG. 16 by blocks in a particular order, this order is exemplary and the operations comprising the blocks can be performed in different orders than shown, and can be combined and/or divided into blocks and/or operations having different functionality than shown. Optional blocks and/or operations are indicated by dashed lines.

The exemplary method and/or procedure can include the operations of block 1610, where the first node can receive, from a first downstream node in the IAB network, a first buffer status report (BSR) indicating a first amount of uplink (UL) data. The first amount of data can include one or more of the following: an amount of UL data buffered at the first downstream node, and an amount of UL data expected to be received by the first downstream node. The exemplary method and/or procedure can also include the operations of block 1650, where the first node can send, to the first downstream node, a first UL resource grant indicating a time schedule of resources available for the first downstream node to transmit at least a portion of the first amount of data.

In some embodiments, the exemplary method and/or procedure can also include the operations of block 1660, where the first node can send a second BSR to an upstream node in the IAB network. The second BSR can indicate a second amount of UL data, with the second amount including the at least a portion of the first amount as well as UL data buffered at the first node. In some embodiments, the first UL resource grant can be sent (e.g., in block 1650) after receiving the first BSR and without receiving a second UL resource grant from the upstream node in response to the second BSR. This can correspond to the scenarios shown in FIGS. 14-15. In some embodiments, the first UL resource grant can be sent to the first downstream node before sending the second BSR to the upstream node. This can correspond to the scenario shown in FIG. 15.

In some embodiments, the second amount of UL data indicated by the second BSR can be based the first amount of UL data indicated in the first BSR, or on an amount of UL data indicated by the first UL resource grant. In some embodiments, the second amount of UL data indicated by the second BSR can be further based on free buffer space available, at the first node, for receiving UL data from the first downstream node.

In some embodiments, the first BSR can include a first hop count value that indicates a number of downstream intermediate nodes between the first downstream node and a further downstream node having buffered UL data included in the first amount. In such embodiments, the exemplary method and/or procedure can also include the operations of block 1630, where the first node can increment the first hop count value to form a second hop count value, and the second hop count value can be included in the second BSR sent to the upstream node (e.g., in block 1660). In such embodiments, the exemplary method and/or procedure can also include the operations of block 1620, where the first node can determine one or more of the following based on the first hop count value: the time schedule indicated by the UL grant, and the second amount of UL data indicated by the second BSR.

In some embodiments, the operations of block 1620 can include the operations of sub-blocks 1621-1622. In sub-block 1621, the first node can reduce the first amount of UL data by a scaling factor that is dependent upon the first hop count value. For example, such a scaling factor can be represented by a factor $\alpha$, where $0<\alpha<1$. In sub-block 1622, the first node can determine the second amount of UL data based on the reduced first amount and the UL data buffered at the first node.

In some embodiments, the operations of block 1620 can include the operations of sub-blocks 1623-1624. In sub-block 1623, the first node can estimate a delay based on the first hop count and scheduling information associated with the further downstream node having buffered UL data included in the first amount. In sub-block 1624, the first node can, based on the estimated delay, determine the time schedule such that the first UL resource grant becomes valid when the UL data buffered at the further downstream node is available at the first downstream node.

In other embodiments, the first BSR can include a time count value that indicates when one of the following received a further BSR related to the first BSR: the first downstream node, or a second downstream node that is downstream in the IAB network with respect to the first downstream node. In such embodiments, the exemplary method and/or procedure can also include the operations of block 1640, where the first node can determine one or more of the following based on the time value: the time schedule indicated by the UL grant, and the second amount of UL data indicated by the second BSR.

In some embodiments, the operations of block 1640 can include the operations of sub-blocks 1641-1642. In sub-block 1641, the first node can reduce the first amount of UL data by a scaling factor that is dependent upon the time value. For example, such a scaling factor can be represented by a factor $\alpha$, where $0<\alpha<1$. In sub-block 1642, the first node can determine the second amount of UL data based on the reduced first amount and the UL data buffered at the first node. For example, the operations in sub-block 1642 can be performed in the same manner as the operations in sub-block 1622, described above.

In some embodiments, the operations of block 1640 can include the operations of sub-blocks 1643-1644. In sub-block 1643, the first node can estimate a delay based on a difference between the time value and the current time. In sub-block 1644, the first node can, based on the estimated delay, determine the time schedule such that the first UL resource grant becomes valid when the UL data buffered at the further downstream node is available at the first downstream node. For example, the operations in sub-block 1644 can be performed in the same manner as the operations in sub-block 1624, described above.

In some embodiments, the first node can be a donor distributed unit (DU) associated with a base station. In other embodiments, the first node can be an intermediate IAB node in the IAB network that includes, e.g., a distributed unit (DU) part and a mobile terminal (MT) part. In such embodiments, receiving the first BSR (e.g., block 1610) and sending the first UL resource grant (e.g., block 1650) can be performed by the DU part, and sending the second BSR (e.g., operation 1660) can be performed by the MT part.

In some of these embodiments, the first downstream node can be an intermediate node in the IAB network. In such embodiments, the amount of UL data expected to be received by the first downstream node can include UL data buffered at one or more second downstream nodes that are downstream in the IAB network with respect to the first downstream node.

In others of these embodiments, the first downstream node can be a user equipment (UE). In such embodiments, the first amount can include only the amount of UL data buffered at the UE.

Figure 17:
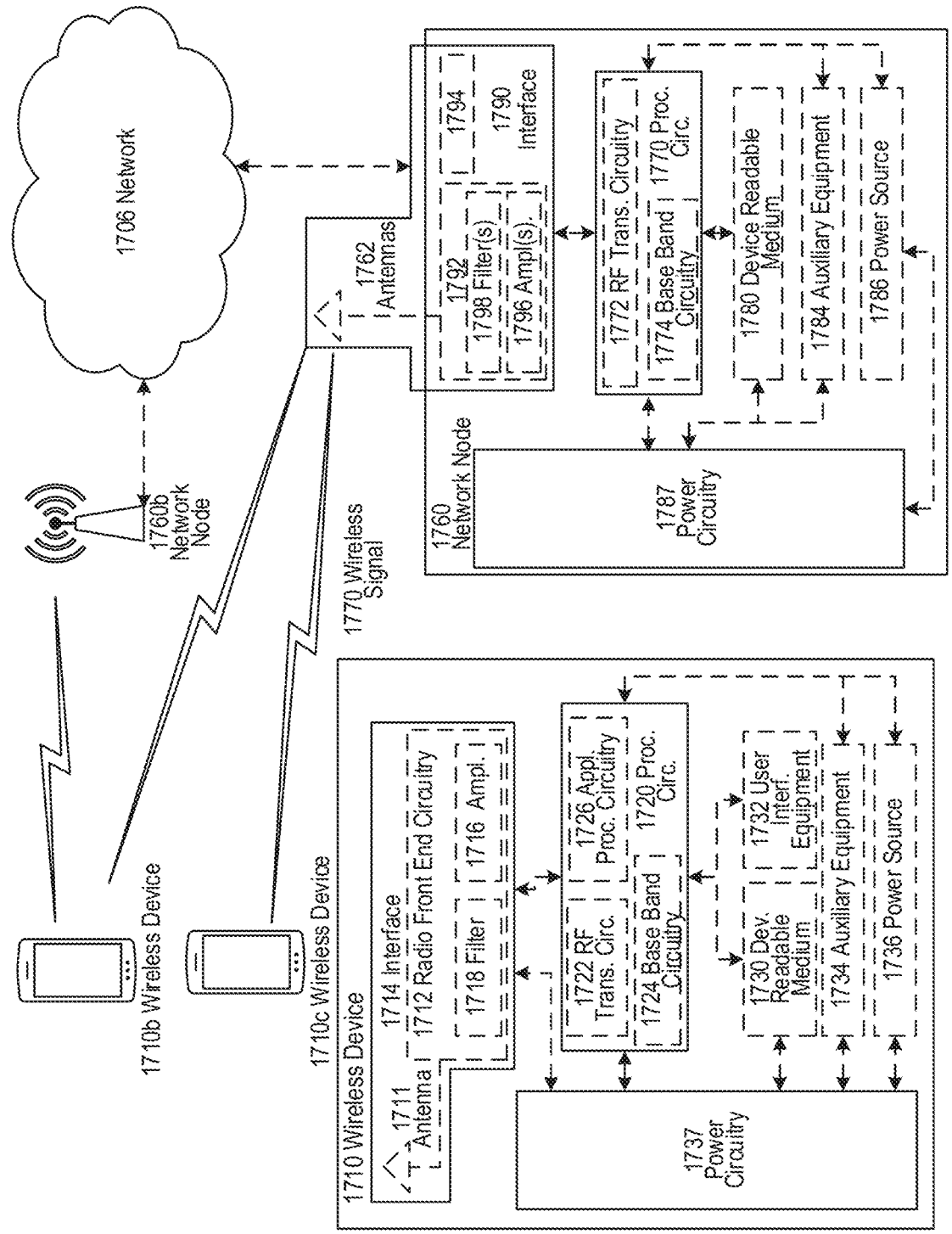
FIG. 17 illustrates an exemplary wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760*b*, and WDs 1710, 1710*b*, and 1710*c*. In practice, a wireless network can further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

In addition to the non-limiting examples mentioned above, other examples of network nodes include access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Additional examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1760 are depicted as single boxes located within a larger box, or nested within multiple boxes, in practice, a network node can comprise multiple different physical components that make up a single illustrated component (e.g., device readable medium 1780 can comprise multiple separate hard drives as well as multiple RAM modules).

Similarly, network node 1760 can be composed of multiple physically separate components (e.g., a NodeB component and a RNC component, or a BTS component and a BSC component, etc.), which can each have their own respective components. In certain scenarios in which network node 1760 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1760 can be configured to support multiple radio access technologies (RATs). In such embodiments, some components can be duplicated (e.g., separate device readable medium 1780 for the different RATs) and some components can be reused (e.g., the same antenna 1762 can be shared by the RATs). Network node 1760 can also include multiple sets of the various illustrated components for different wireless technologies integrated into network node 1760, such as, for example, GSM, WCDMA, LTE, NR, WiFi, or Bluetooth wireless technologies. These wireless technologies can be integrated into the same or different chip or set of chips and other components within network node 1760.

Processing circuitry 1770 can be configured to perform any determining, calculating, or similar operations (e.g., certain obtaining operations) described herein as being provided by a network node. These operations performed by processing circuitry 1770 can include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1760 components, such as device readable medium 1780, network node 1760 functionality. For example, processing circuitry 1770 can execute instructions stored in device readable medium 1780 or in memory within processing circuitry 1770. Such functionality can include providing any of the various wireless features, functions, or benefits discussed herein. In some embodiments, processing circuitry 1770 can include a system on a chip (SOC).

In some embodiments, processing circuitry 1770 can include one or more of radio frequency (RF) transceiver circuitry 1772 and baseband processing circuitry 1774. In some embodiments, radio frequency (RF) transceiver circuitry 1772 and baseband processing circuitry 1774 can be on separate chips (or sets of chips), boards, or units, such as radio units and digital units. In alternative embodiments, part or all of RF transceiver circuitry 1772 and baseband processing circuitry 1774 can be on the same chip or set of chips, boards, or units In certain embodiments, some or all of the functionality described herein as being provided by a network node, base station, eNB or other such network device can be performed by processing circuitry 1770 executing instructions stored on device readable medium 1780 or memory within processing circuitry 1770. In alternative embodiments, some or all of the functionality can be provided by processing circuitry 1770 without executing instructions stored on a separate or discrete device readable medium, such as in a hard-wired manner In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760, but are enjoyed by network node 1760 as a whole, and/or by end users and the wireless network generally.

Device readable medium 1780 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1770. Device readable medium 1780 can store any suitable instructions, data or information, including a computer program, software, an application including one or more of logic, rules, code, tables, etc. and/or other instructions capable of being executed by processing circuitry 1770 and, utilized by network node 1760. Device readable medium 1780 can be used to store any calculations made by processing circuitry 1770 and/or any data received via interface 1790. In some embodiments, processing circuitry 1770 and device readable medium 1780 can be considered to be integrated.

Interface 1790 is used in the wired or wireless communication of signalling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that can be coupled to, or in certain embodiments a part of, antenna 1762. Radio front end circuitry 1792 comprises filters 1798 and amplifiers 1796. Radio front end circuitry 1792 can be connected to antenna 1762 and processing circuitry 1770. Radio front end circuitry can be configured to condition signals communicated between antenna 1762 and processing circuitry 1770. Radio front end circuitry 1792 can receive digital data that is to be sent out to other network nodes or WDs via a wireless connection. Radio front end circuitry 1792 can convert the digital data into a radio signal having the appropriate channel and bandwidth parameters using a combination of filters 1798 and/or amplifiers 1796. The radio signal can then be transmitted via antenna 1762. Similarly, when receiving data, antenna 1762 can collect radio signals which are then converted into digital data by radio front end circuitry 1792. The digital data can be passed to processing circuitry 1770. In other embodiments, the interface can comprise different components and/or different combinations of components.

In certain alternative embodiments, network node 1760 may not include separate radio front end circuitry 1792, instead, processing circuitry 1770 can comprise radio front end circuitry and can be connected to antenna 1762 without separate radio front end circuitry 1792. Similarly, in some embodiments, all or some of RF transceiver circuitry 1772 can be considered a part of interface 1790. In still other embodiments, interface 1790 can include one or more ports or terminals 1794, radio front end circuitry 1792, and RF transceiver circuitry 1772, as part of a radio unit (not shown), and interface 1790 can communicate with baseband processing circuitry 1774, which is part of a digital unit (not shown).

Antenna 1762 can include one or more antennas, or antenna arrays, configured to send and/or receive wireless signals. Antenna 1762 can be coupled to radio front end circuitry 1790 and can be any type of antenna capable of transmitting and receiving data and/or signals wirelessly. In some embodiments, antenna 1762 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1762 can be separate from network node 1760 and can be connectable to network node 1760 through an interface or port.

Antenna 1762, interface 1790, and/or processing circuitry 1770 can be configured to perform any receiving operations and/or certain obtaining operations described herein as being performed by a network node. Any information, data and/or signals can be received from a wireless device, another network node and/or any other network equipment. Similarly, antenna 1762, interface 1790, and/or processing circuitry 1770 can be configured to perform any transmitting operations described herein as being performed by a network node. Any information, data and/or signals can be transmitted to a wireless device, another network node and/or any other network equipment.

Power circuitry 1787 can comprise, or be coupled to, power management circuitry and can be configured to supply the components of network node 1760 with power for performing the functionality described herein. Power circuitry 1787 can receive power from power source 1786. Power source 1786 and/or power circuitry 1787 can be configured to provide power to the various components of network node 1760 in a form suitable for the respective components (e.g., at a voltage and current level needed for each respective component). Power source 1786 can either be included in, or external to, power circuitry 1787 and/or network node 1760. For example, network node 1760 can be connectable to an external power source (e.g., an electricity outlet) via an input circuitry or interface such as an electrical cable, whereby the external power source supplies power to power circuitry 1787. As a further example, power source 1786 can comprise a source of power in the form of a battery or battery pack which is connected to, or integrated in, power circuitry 1787. The battery can provide backup power should the external power source fail. Other types of power sources, such as photovoltaic devices, can also be used.

Alternative embodiments of network node 1760 can include additional components beyond those shown in FIG. 17 that can be responsible for providing certain aspects of the network node's functionality, including any of the functionality described herein and/or any functionality necessary to support the subject matter described herein. For example, network node 1760 can include user interface equipment to allow and/or facilitate input of information into network node 1760 and to allow and/or facilitate output of information from network node 1760. This can allow and/or facilitate a user to perform diagnostic, maintenance, repair, and other administrative functions for network node 1760.

In some embodiments, a wireless device (WD, e.g., WD 1710) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink (SL) communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, WD 1710 includes antenna 1711, interface 1714, processing circuitry 1720, device readable medium 1730, user interface equipment 1732, auxiliary equipment 1734, power source 1736 and power circuitry 1737. WD 1710 can include multiple sets of one or more of the illustrated components for different wireless technologies supported by WD 1710, such as, for example, GSM, WCDMA, LTE, NR, WiFi, WiMAX, or Bluetooth wireless technologies, just to mention a few. These wireless technologies can be integrated into the same or different chips or set of chips as other components within WD 1710.

Antenna 1711 can include one or more antennas or antenna arrays, configured to send and/or receive wireless signals, and is connected to interface 1714. In certain alternative embodiments, antenna 1711 can be separate from WD 1710 and be connectable to WD 1710 through an interface or port. Antenna 1711, interface 1714, and/or processing circuitry 1720 can be configured to perform any receiving or transmitting operations described herein as being performed by a WD. Any information, data and/or signals can be received from a network node and/or another WD. In some embodiments, radio front end circuitry and/or antenna 1711 can be considered an interface.

As illustrated, interface 1714 comprises radio front end circuitry 1712 and antenna 1711. Radio front end circuitry 1712 comprise one or more filters 1718 and amplifiers 1716. Radio front end circuitry 1714 is connected to antenna 1711 and processing circuitry 1720, and can be configured to condition signals communicated between antenna 1711 and processing circuitry 1720. Radio front end circuitry 1712 can be coupled to or a part of antenna 1711. In some embodiments, WD 1710 may not include separate radio front end circuitry 1712; rather, processing circuitry 1720 can comprise radio front end circuitry and can be connected to antenna 1711. Similarly, in some embodiments, some or all of RF transceiver circuitry 1722 can be considered a part of interface 1714. Radio front end circuitry 1712 can receive digital data that is to be sent out to other network nodes or WDs via a wireless connection. Radio front end circuitry 1712 can convert the digital data into a radio signal having the appropriate channel and bandwidth parameters using a combination of filters 1718 and/or amplifiers 1716. The radio signal can then be transmitted via antenna 1711. Similarly, when receiving data, antenna 1711 can collect radio signals which are then converted into digital data by radio front end circuitry 1712. The digital data can be passed to processing circuitry 1720. In other embodiments, the interface can comprise different components and/or different combinations of components.

Processing circuitry 1720 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1710 components, such as device readable medium 1730, WD 1710 functionality. Such functionality can include providing any of the various wireless features or benefits discussed herein. For example, processing circuitry 1720 can execute instructions stored in device readable medium 1730 or in memory within processing circuitry 1720 to provide the functionality disclosed herein.

As illustrated, processing circuitry 1720 includes one or more of RF transceiver circuitry 1722, baseband processing circuitry 1724, and application processing circuitry 1726. In other embodiments, the processing circuitry can comprise different components and/or different combinations of components. In certain embodiments processing circuitry 1720 of WD 1710 can comprise a SOC. In some embodiments, RF transceiver circuitry 1722, baseband processing circuitry 1724, and application processing circuitry 1726 can be on separate chips or sets of chips. In alternative embodiments, part or all of baseband processing circuitry 1724 and application processing circuitry 1726 can be combined into one chip or set of chips, and RF transceiver circuitry 1722 can be on a separate chip or set of chips. In still alternative embodiments, part or all of RF transceiver circuitry 1722 and baseband processing circuitry 1724 can be on the same chip or set of chips, and application processing circuitry 1726 can be on a separate chip or set of chips. In yet other alternative embodiments, part or all of RF transceiver circuitry 1722, baseband processing circuitry 1724, and application processing circuitry 1726 can be combined in the same chip or set of chips. In some embodiments, RF transceiver circuitry 1722 can be a part of interface 1714. RF transceiver circuitry 1722 can condition RF signals for processing circuitry 1720.

In certain embodiments, some or all of the functionality described herein as being performed by a WD can be provided by processing circuitry 1720 executing instructions stored on device readable medium 1730, which in certain embodiments can be a computer-readable storage medium. In alternative embodiments, some or all of the functionality can be provided by processing circuitry 1720 without executing instructions stored on a separate or discrete device readable storage medium, such as in a hard-wired manner In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 can be configured to perform any determining, calculating, or similar operations (e.g., certain obtaining operations) described herein as being performed by a WD. These operations, as performed by processing circuitry 1720, can include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 can be operable to store a computer program, software, an application including one or more of logic, rules, code, tables, etc. and/or other instructions capable of being executed by processing circuitry 1720. Device readable medium 1730 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1720. In some embodiments, processing circuitry 1720 and device readable medium 1730 can be considered to be integrated.

User interface equipment 1732 can include components that allow and/or facilitate a human user to interact with WD 1710. Such interaction can be of many forms, such as visual, audial, tactile, etc. User interface equipment 1732 can be operable to produce output to the user and to allow and/or facilitate the user to provide input to WD 1710. The type of interaction can vary depending on the type of user interface equipment 1732 installed in WD 1710. For example, if WD 1710 is a smart phone, the interaction can be via a touch screen; if WD 1710 is a smart meter, the interaction can be through a screen that provides usage (e.g., the number of gallons used) or a speaker that provides an audible alert (e.g., if smoke is detected). User interface equipment 1732 can include input interfaces, devices and circuits, and output interfaces, devices and circuits. User interface equipment 1732 can be configured to allow and/or facilitate input of information into WD 1710, and is connected to processing circuitry 1720 to allow and/or facilitate processing circuitry 1720 to process the input information. User interface equipment 1732 can include, for example, a microphone, a proximity or other sensor, keys/buttons, a touch display, one or more cameras, a USB port, or other input circuitry. User interface equipment 1732 is also configured to allow and/or facilitate output of information from WD 1710, and to allow and/or facilitate processing circuitry 1720 to output information from WD 1710. User interface equipment 1732 can include, for example, a speaker, a display, vibrating circuitry, a USB port, a headphone interface, or other output circuitry. Using one or more input and output interfaces, devices, and circuits, of user interface equipment 1732, WD 1710 can communicate with end users and/or the wireless network, and allow and/or facilitate them to benefit from the functionality described herein.

Auxiliary equipment 1734 is operable to provide more specific functionality which may not be generally performed by WDs. This can comprise specialized sensors for doing measurements for various purposes, interfaces for additional types of communication such as wired communications etc. The inclusion and type of components of auxiliary equipment 1734 can vary depending on the embodiment and/or scenario.

Power source 1736 can, in some embodiments, be in the form of a battery or battery pack. Other types of power sources, such as an external power source (e.g., an electricity outlet), photovoltaic devices or power cells, can also be used. WD 1710 can further comprise power circuitry 1737 for delivering power from power source 1736 to the various parts of WD 1710 which need power from power source 1736 to carry out any functionality described or indicated herein. Power circuitry 1737 can in certain embodiments comprise power management circuitry. Power circuitry 1737 can additionally or alternatively be operable to receive power from an external power source; in which case WD 1710 can be connectable to the external power source (such as an electricity outlet) via input circuitry or an interface such as an electrical power cable. Power circuitry 1737 can also in certain embodiments be operable to deliver power from an external power source to power source 1736. This can be, for example, for the charging of power source 1736. Power circuitry 1737 can perform any converting or other modification to the power from power source 1736 to make it suitable for supply to the respective components of WD 1710.

Figure 18:
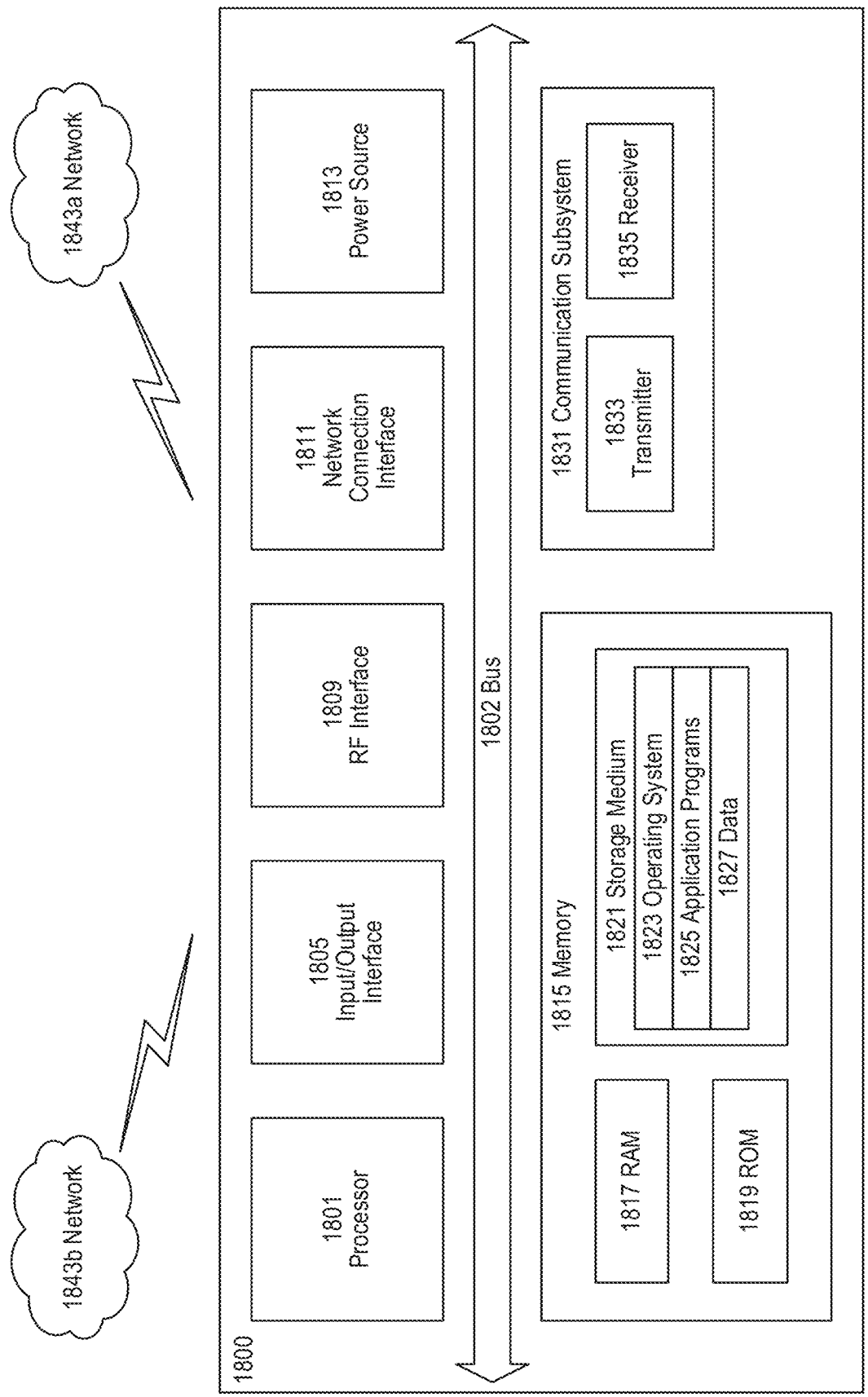
FIG. 18 illustrates an exemplary user equipment (UE), according to various exemplary embodiments of the present disclosure.

FIG. 18 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 18200 can be any UE identified by the $3^{rd}$ Generation Partnership Project (3GPP), including a NB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 can include other similar types of information. Certain UEs can utilize all of the components shown in FIG. 18, or only a subset of the components. The level of integration between the components can vary from one UE to another UE. Further, certain UEs can contain multiple instances of a component, such as multiple processors, memories, transceivers, transmitters, receivers, etc.

In FIG. 18, processing circuitry 1801 can be configured to process computer instructions and data. Processing circuitry 1801 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 can include two central processing units (CPUs). Data can be information in a form suitable for use by a computer.

In the depicted embodiment, input/output interface 1805 can be configured to provide a communication interface to an input device, output device, or input and output device. UE 1800 can be configured to use an output device via input/output interface 1805. An output device can use the same type of interface port as an input device. For example, a USB port can be used to provide input to and output from UE 1800. The output device can be a speaker, a sound card, a video card, a display, a monitor, a printer, an actuator, an emitter, a smartcard, another output device, or any combination thereof. UE 1800 can be configured to use an input device via input/output interface 1805 to allow and/or facilitate a user to capture information into UE 1800. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 18, RF interface 1809 can be configured to provide a communication interface to RF components such as a transmitter, a receiver, and an antenna. Network connection interface 1811 can be configured to provide a communication interface to network 1843a. Network 1843a can encompass wired and/or wireless networks such as a local-area network (LAN), a wide-area network (WAN), a computer network, a wireless network, a telecommunications network, another like network or any combination thereof. For example, network 1843a can comprise a Wi-Fi network. Network connection interface 1811 can be configured to include a receiver and a transmitter interface used to communicate with one or more other devices over a communication network according to one or more communication protocols, such as Ethernet, TCP/IP, SONET, ATM, or the like. Network connection interface 1811 can implement receiver and transmitter functionality appropriate to the communication network links (e.g., optical, electrical, and the like). The transmitter and receiver functions can share circuit components, software or firmware, or alternatively can be implemented separately.

RAM 1817 can be configured to interface via bus 1802 to processing circuitry 1801 to provide storage or caching of data or computer instructions during the execution of software programs such as the operating system, application programs, and device drivers. ROM 1819 can be configured to provide computer instructions or data to processing circuitry 1801. For example, ROM 1819 can be configured to store invariant low-level system code or data for basic system functions such as basic input and output (I/O), startup, or reception of keystrokes from a keyboard that are stored in a non-volatile memory. Storage medium 1821 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1821 can be configured to include operating system 1823, application program 1825 such as a web browser application, a widget or gadget engine or another application, and data file 1827. Storage medium 1821 can store, for use by UE 1800, any of a variety of various operating systems or combinations of operating systems.

Storage medium 1821 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 can allow and/or facilitate UE 1800 to access computer-executable instructions, application programs or the like, stored on transitory or non-transitory memory media, to off-load data, or to upload data. An article of manufacture, such as one utilizing a communication system can be tangibly embodied in storage medium 1821, which can comprise a device readable medium.

In FIG. 18, processing circuitry 1801 can be configured to communicate with network 1843b using communication subsystem 1831. Network 1843a and network 1843b can be the same network or networks or different network or networks. Communication subsystem 1831 can be configured to include one or more transceivers used to communicate with network 1843b. For example, communication subsystem 1831 can be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver can include transmitter 1833 and/or receiver 1835 to implement transmitter or receiver functionality, respectively, appropriate to the RAN links (e.g., frequency allocations and the like). Further, transmitter 1833 and receiver 1835 of each transceiver can share circuit components, software or firmware, or alternatively can be implemented separately.

In the illustrated embodiment, the communication functions of communication subsystem 1831 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 can include cellular communication, Wi-Fi communication, Bluetooth communication, and GPS communication. Network 1843b can encompass wired and/or wireless networks such as a local-area network (LAN), a wide-area network (WAN), a computer network, a wireless network, a telecommunications network, another like network or any combination thereof. For example, network 1843b can be a cellular network, a Wi-Fi network, and/or a near-field network. Power source 1813 can be configured to provide alternating current (AC) or direct current (DC) power to components of UE 1800.

The features, benefits and/or functions described herein can be implemented in one of the components of UE 1800 or partitioned across multiple components of UE 1800. Further, the features, benefits, and/or functions described herein can be implemented in any combination of hardware, software or firmware. In one example, communication subsystem 1831 can be configured to include any of the components described herein. Further, processing circuitry 1801 can be configured to communicate with any of such components over bus 1802. In another example, any of such components can be represented by program instructions stored in memory that when executed by processing circuitry 1801 perform the corresponding functions described herein. In another example, the functionality of any of such components can be partitioned between processing circuitry 1801 and communication subsystem 1831. In another example, the non-computationally intensive functions of any of such components can be implemented in software or firmware and the computationally intensive functions can be implemented in hardware.

Figure 19:
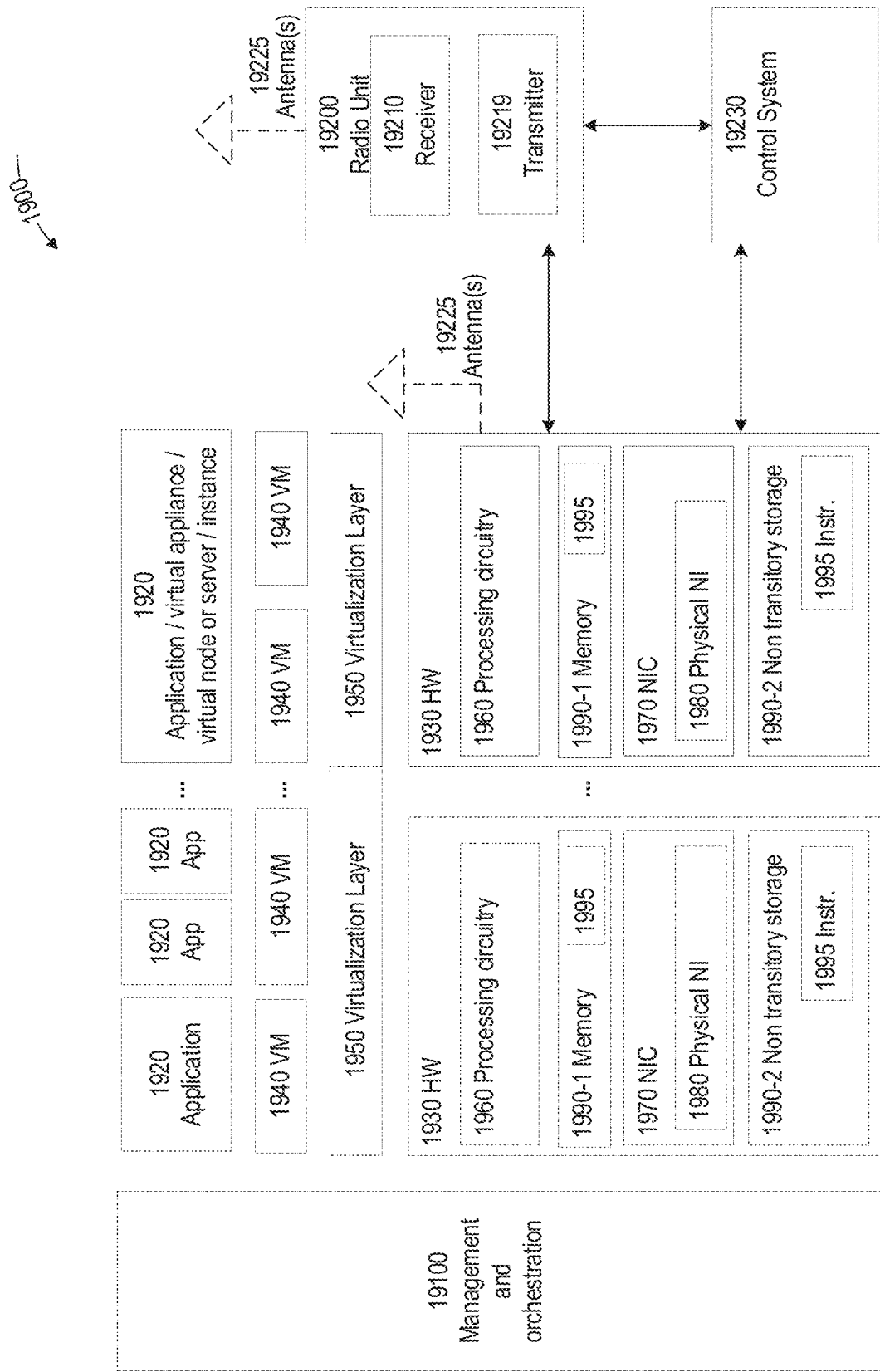
FIG. 19 illustrates an exemplary virtualization environment usable for implementing various embodiments of network nodes described herein.

FIG. 19 is a schematic block diagram illustrating a virtualization environment 1900 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node can be entirely virtualized.

The functions can be implemented by one or more applications 1920 (which can alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which can be commercial off-the-shelf (COTS) processors, dedicated Application Specific Integrated Circuits (ASICs), or any other type of processing circuitry including digital or analog hardware components or special purpose processors. Each hardware device can comprise memory 1990-1 which can be non-persistent memory for temporarily storing instructions 1995 or software executed by processing circuitry 1960. Each hardware device can comprise one or more network interface controllers (NICs) 1970, also known as network interface cards, which include physical network interface 1980. Each hardware device can also include non-transitory, persistent, machine-readable storage media 1990-2 having stored therein software 1995 and/or instructions executable by processing circuitry 1960. Software 1995 can include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and can be run by a corresponding virtualization layer 1950 or hypervisor. Different embodiments of the instance of virtual appliance 1920 can be implemented on one or more of virtual machines 1940, and the implementations can be made in different ways.

During operation, processing circuitry 1960 executes software 1995 to instantiate the hypervisor or virtualization layer 1950, which can sometimes be referred to as a virtual machine monitor (VMM). Virtualization layer 1950 can present a virtual operating platform that appears like networking hardware to virtual machine 1940.

As shown in FIG. 19, hardware 1930 can be a standalone network node with generic or specific components. Hardware 1930 can comprise antenna 19225 and can implement some functions via virtualization. Alternatively, hardware 1930 can be part of a larger cluster of hardware (e.g., such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1940 can be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 can be coupled to one or more antennas 19225. Radio units 19200 can communicate directly with hardware nodes 1930 via one or more appropriate network interfaces and can be used in combination with the virtual components to provide a virtual node with radio capabilities, such as a radio access node or a base station.

In some embodiments, some signalling can be effected with the use of control system 19230 which can alternatively be used for communication between the hardware nodes 1930 and radio units 19200.

Figure 20:
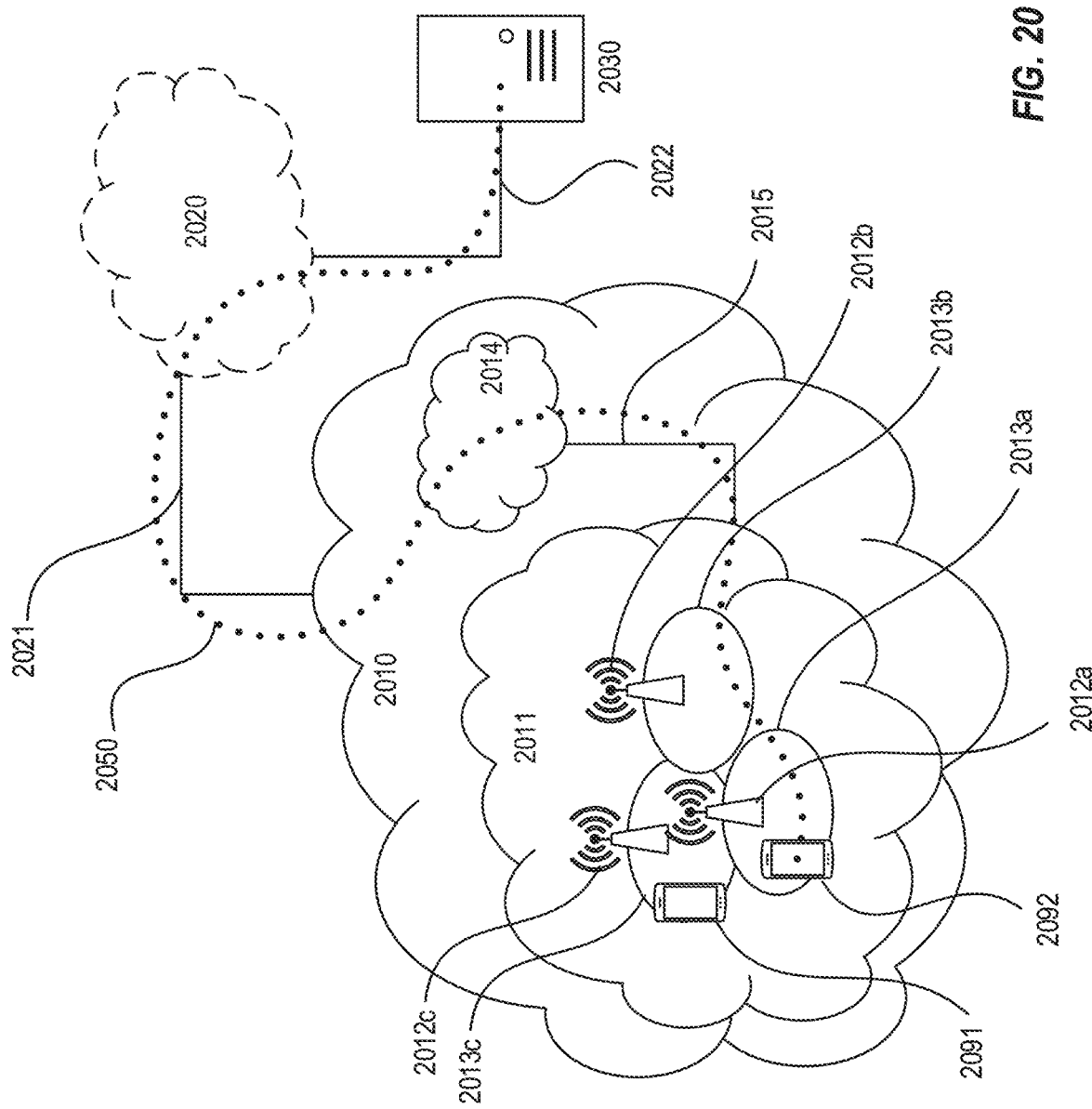
FIGS. 20-21 are block diagrams of various exemplary communication systems and/or networks, according to various exemplary embodiments of the present disclosure.

With reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012*a*, 2012*b*, 2012*c*, such as NBs, eNBs, gNBs or other types of wireless access points, each defining a corresponding coverage area 2013*a*, 2013*b*, 2013*c*. Each base station 2012*a*, 2012*b*, 2012*c* is connectable to core network 2014 over a wired or wireless connection 2015. A first UE 2091 located in coverage area 2013*c* can be configured to wirelessly connect to, or be paged by, the corresponding base station 2012*c*. A second UE 2092 in coverage area 2013*a* is wirelessly connectable to the corresponding base station 2012*a*. While a plurality of UEs 2091, 2092 are illustrated in this example, the disclosed embodiments are equally applicable to a situation where a sole UE is in the coverage area or where a sole UE is connecting to the Telecommunication network 2010 is itself connected to host computer 2030, which can be embodied in the hardware and/or software of a standalone server, a cloud-implemented server, a distributed server or as processing resources in a server farm. Host computer 2030 can be under the ownership or control of a service provider, or can be operated by the service provider or on behalf of the service provider. Connections 2021 and 2022 between telecommunication network 2010 and host computer 2030 can extend directly from core network 2014 to host computer 2030 or can go via an optional intermediate network 2020. Intermediate network 2020 can be one of, or a combination of more than one of, a public, private or hosted network; intermediate network 2020, if any, can be a backbone network or the Internet; in particular, intermediate network 2020 can comprise two or more sub-networks (not shown).

The communication system of FIG. 20 as a whole enables connectivity between the connected UEs 2091, 2092 and host computer 2030. The connectivity can be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 can be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Example implementations, in accordance with an embodiment, of the UE, base station and host computer discussed in the preceding paragraphs will now be described with reference to FIG. 21. In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which can have storage and/or processing capabilities. In particular, processing circuitry 2118 can comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 can be operable to provide a service to a remote user, such as UE 2130 connecting via OTT connection 2150 terminating at UE 2130 and host computer 2110. In providing the service to the remote user, host application 2112 can provide user data which is transmitted using OTT connection 2150.

Communication system 2100 can also include base station 2120 provided in a telecommunication system and comprising hardware 2125 enabling it to communicate with host computer 2110 and with UE 2130. Hardware 2125 can include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 can be configured to facilitate connection 2160 to host computer 2110. Connection 2160 can be direct or it can pass through a core network (not shown in FIG. 21) of the telecommunication system and/or through one or more intermediate networks outside the telecommunication system. In the embodiment shown, hardware 2125 of base station 2120 can also include processing circuitry 2128, which can comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 can also include UE 2130 already referred to. Its hardware 2135 can include radio interface 2137 configured to set up and maintain wireless connection 2170 with a base station serving a coverage area in which UE 2130 is currently located. Hardware 2135 of UE 2130 can also include processing circuitry 2138, which can comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 can be operable to provide a service to a human or non-human user via UE 2130, with the support of host computer 2110. In host computer 2110, an executing host application 2112 can communicate with the executing client application 2132 via OTT connection 2150 terminating at UE 2130 and host computer 2110. In providing the service to the user, client application 2132 can receive request data from host application 2112 and provide user data in response to the request data. OTT connection 2150 can transfer both the request data and the user data. Client application 2132 can interact with the user to generate the user data that it provides.

Figure 21:
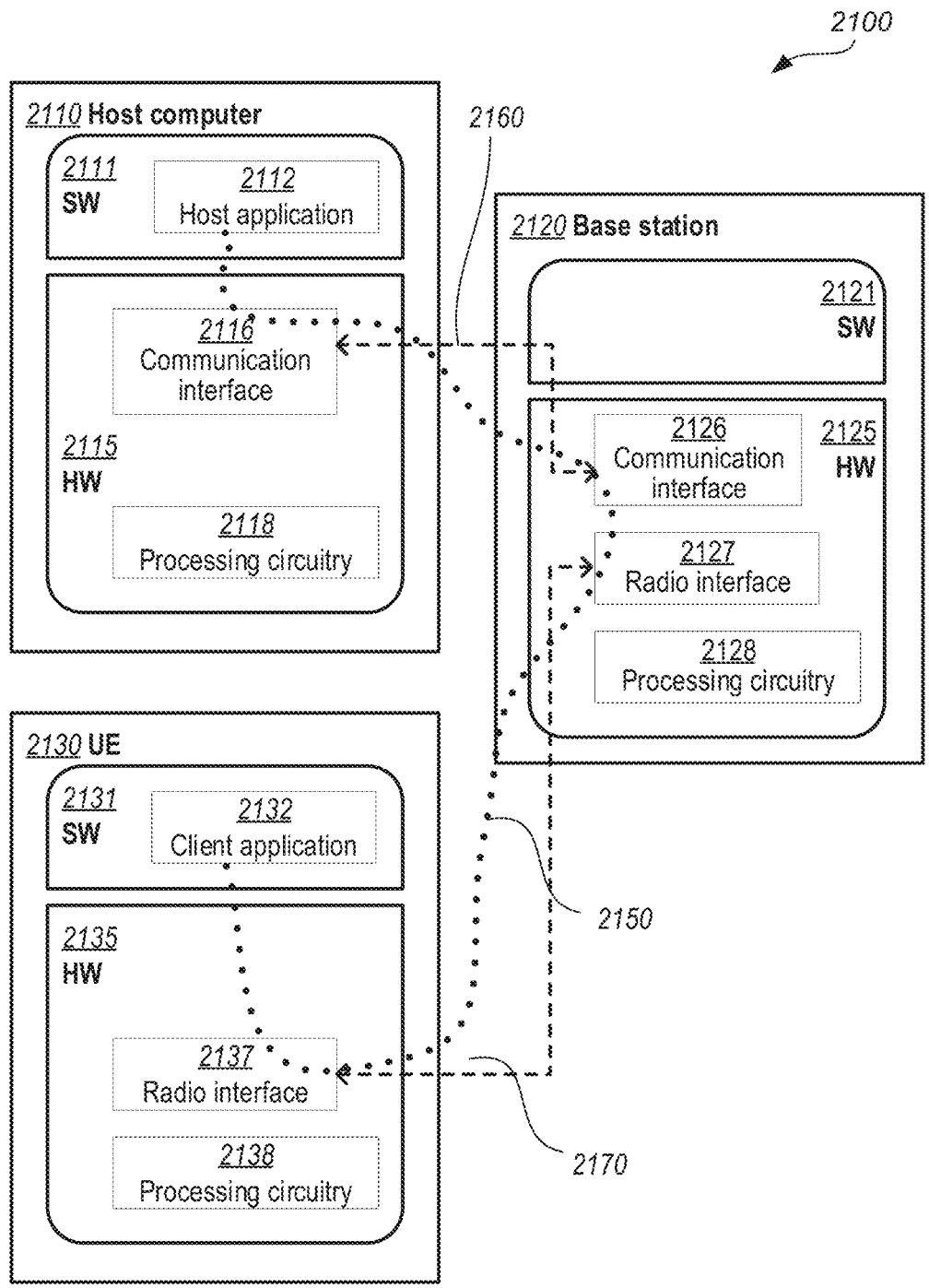

It is noted that host computer 2110, base station 2120 and UE 2130 illustrated in FIG. 21 can be similar or identical to host computer 2030, one of base stations 2012a, 2012b, 2012c and one of UEs 2091, 2092 of FIG. 20, respectively. This is to say, the inner workings of these entities can be as shown in FIG. 21 and independently, the surrounding network topology can be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure can determine the routing, which it can be configured to hide from UE 2130 or from the service provider operating host computer 2110, or both. While OTT connection 2150 is active, the network infrastructure can further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacitiy, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2150 between host computer 2110 and UE 2130, in response to variations in the measurement results. The measurement procedure and/or the network functionality for reconfiguring OTT connection 2150 can be implemented in software 2111 and hardware 2115 of host computer 2110 or in software 2131 and hardware 2135 of UE 2130, or both. In embodiments, sensors (not shown) can be deployed in or in association with communication devices through which OTT connection 2150 passes; the sensors can participate in the measurement procedure by supplying values of the monitored quantities exemplified above, or supplying values of other physical quantities from which software 2111, 2131 can compute or estimate the monitored quantities. The reconfiguring of OTT connection 2150 can include message format, retransmission settings, preferred routing etc.; the reconfiguring need not affect base station 2120, and it can be unknown or imperceptible to base station 2120. Such procedures and functionalities can be known and practiced in the art. In certain embodiments, measurements can involve proprietary UE signaling facilitating host computer 2110's measurements of throughput, propagation times, latency and the like. The measurements can be implemented in that software 2111 and 2131 causes messages to be transmitted, in particular empty or 'dummy' messages, using OTT connection 2150 while it monitors propagation times, errors etc.

FIG. 22 is a flowchart illustrating an exemplary method and/or procedure implemented in a communication system, in accordance with one embodiment. The communication system includes a host computer, a base station and a UE which, in some exemplary embodiments, can be those described with reference to FIGS. 20 and 21. For simplicity of the present disclosure, only drawing references to FIG. 22 will be included in this section. In step 2210, the host computer provides user data. In substep 2211 (which can be optional) of step 2210, the host computer provides the user data by executing a host application. In step 2220, the host computer initiates a transmission carrying the user data to the UE. In step 2230 (which can be optional), the base station transmits to the UE the user data which was carried in the transmission that the host computer initiated, in accordance with the teachings of the embodiments described throughout this disclosure. In step 2240 (which can also be optional), the UE executes a client application associated with the host application executed by the host computer.

FIG. 23 is a flowchart illustrating an exemplary method and/or procedure implemented in a communication system, in accordance with one embodiment. The communication system includes a host computer, a base station and a UE which can be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission can pass via the base station, in accordance with the teachings of the embodiments described throughout this disclosure. In step 2330 (which can be optional), the UE receives the user data carried in the transmission.

FIG. 24 is a flowchart illustrating an exemplary method and/or procedure implemented in a communication system, in accordance with one embodiment. The communication system includes a host computer, a base station and a UE which can be those described with reference to FIGS. 20 and 21. For simplicity of the present disclosure, only drawing references to FIG. 24 will be included in this section. In step 2410 (which can be optional), the UE receives input data provided by the host computer. Additionally or alternatively, in step 2420, the UE provides user data. In substep 2421 (which can be optional) of step 2420, the UE provides the user data by executing a client application. In substep 2411 (which can be optional) of step 2410, the UE executes a client application which provides the user data in reaction to the received input data provided by the host computer. In providing the user data, the executed client application can further consider user input received from the user. Regardless of the specific manner in which the user data was provided, the UE initiates, in substep 2430 (which can be optional), transmission of the user data to the host computer. In step 2440 of the method, the host computer receives the user data transmitted from the UE, in accordance with the teachings of the embodiments described throughout this disclosure.

FIG. 25 is a flowchart illustrating an exemplary method and/or procedure implemented in a communication system, in accordance with one embodiment. The communication system includes a host computer, a base station and a UE which can be those described with reference to FIGS. 20 and 21. For simplicity of the present disclosure, only drawing references to FIG. 25 will be included in this section. In step 2510 (which can be optional), in accordance with the teachings of the embodiments described throughout this disclosure, the base station receives user data from the UE. In step 2520 (which can be optional), the base station initiates transmission of the received user data to the host computer. In step 2530 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, displaying functions, etc., such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the present disclosure include, but are not limited to, the following enumerated examples.

1. A method for scheduling uplink (UL) transmissions in an integrated access backhaul (IAB) network, the method comprising:
   receiving, from a first downstream node in the IAB network, a first buffer status report (BSR) indicating a first amount of uplink (UL) data buffered at one or more downstream nodes in the IAB network;
   sending a second BSR to an upstream node in the IAB network, wherein the second BSR indicates a second amount of buffered UL data, the second amount comprising UL data buffered the IAB node and an estimated amount of UL data buffered at the one or more downstream nodes; and
   sending, to the first downstream node, a first UL resource grant a indicating a time schedule of resources available for the one or more further downstream nodes to transmit the buffered UL data.
2. The method of embodiment 1, wherein the estimated amount of UL data is based on the first amount of UL data.
3. The method of any of embodiments 1-2, wherein the estimated amount of UL data is based on the first UL resource grant.

4. The method of any of embodiments 1-3, wherein the first downstream node is one of an intermediate IAB node and a user equipment (UE).
5. The method of any of embodiments 1-4, wherein the first UL resource grant indicates resources for use by a downstream node other than the first downstream node.
6. The method of any of embodiments 1-5, wherein the first UL resource grant is sent in response to receiving the first BSR and without waiting for a second UL resource grant, corresponding to the second BSR, from the upstream node.
7. The method of any of embodiments 1-5, further comprising receiving a second UL resource grant, corresponding to the second BSR, from the upstream node, wherein the first UL resource grant is sent in response to receiving the second UL resource grant.
8. The method of any of embodiments 1-7, wherein the first and second BSRs comprise respective first and second hop count values, and further comprising incrementing the first hop count value to form the second hop count value.
9. The method of embodiment 8, further comprising determining the time schedule based on the first hop count value.
10. The method of any of embodiments 8-9, further comprising determining the estimated amount of data based on the first hop count value.
11. The method of any of embodiments 1-7, wherein the first and second BSRs comprise a time value indicating when a downstream node received the first BSR or a further BSR related to the first BSR.
12. The method of embodiment 11, further comprising determining the time schedule based on time value.
13. The method of any of embodiments 11-12, further comprising determining the estimated amount of data based on the time value.
14. The method of any of embodiments 10 or 13, wherein determining the estimated amount of UL data comprises calculating a first estimated amount based on one or more of the first amount of UL data and the first UL resource grant; and calculating the estimated amount by reducing the first estimated amount by a scaling factor that is dependent upon the hop count value or the time value.
15. A method for scheduling uplink (UL) transmissions in an integrated access backhaul (IAB) network, the method comprising:
receiving, from a first downstream node in the IAB network, a buffer status report (BSR) indicating an estimated amount of uplink (UL) data buffered at one or more further downstream nodes in the IAB network; and
sending, to the first downstream node, an UL resource grant indicating a time schedule of resources available for the one or more further downstream nodes to transmit the buffered UL data.
16. The method of embodiment 15, wherein the first UL resource grant indicates available resources for use by a downstream node other than the first downstream node.
17. The method of any of embodiments 15-16, wherein the BSR comprises a hop count value, and further comprising determining the time schedule based on the hop count value.
18. The method of any of embodiments 15-16, wherein the BSR comprises a time value indicating when a downstream node received the first BSR or a further BSR related to the BSR, and further comprising determining the time schedule based on the time value.
19. The method of any of embodiments 15-18, wherein the method is performed by a donor distributed unit (DU) associated with a base station.
20. A node in an integrated access backhaul (IAB) network configured to schedule uplink (UL) transmissions by one or more further nodes in the IAB network, the node comprising:
a communication transceiver;
processing circuitry operatively coupled to the communication transceiver and configured to perform operations corresponding to any of the methods of embodiments 1-19; and
power supply circuitry configured to supply power to the node.
21. A communication system including a host computer, the host computer comprising:
processing circuitry configured to provide user data; and
a communication interface configured to forward the user data to a cellular network for transmission to a user equipment (UE) through a core network (CN) and a radio access network (RAN);
wherein:
the RAN comprises first and second nodes of an integrated access backhaul (IAB) network;
the first node comprises a communication transceiver and processing circuitry configured to perform operations corresponding to any of the methods of embodiments 1-14; and
the second node comprises a communication transceiver and processing circuitry configured to perform operations corresponding to any of the methods of embodiments 15-19.
22. The communication system of embodiment 21, further comprising the UE configured to communicate with the IAB node.
23. The communication system of any of the previous two embodiments, wherein:
the processing circuitry of the host computer is configured to execute a host application, thereby providing the user data; and
the UE comprises processing circuitry configured to execute a client application associated with the host application.
24. A method implemented in a communication system including a host computer, a cellular network, and a user equipment (UE), the method comprising:
at the host computer, providing user data;
at the host computer, initiating a transmission carrying the user data to the UE via a cellular network comprising an integrated access backhaul (IAB) network; and
operations, performed by first and second nodes of the IAB network, corresponding to any of the methods of embodiments 1-19.
25. The method of embodiment 24, wherein the data message comprises the user data, and further comprising transmitting the user data by the access node.
26. The method of any of embodiments 24-25, wherein the user data is provided at the host computer by executing a host application, the method further comprising, at the UE, executing a client application associated with the host application.
27. A communication system including a host computer comprising a communication interface configured to receive user data originating from a transmission from a user equipment (UE) to a base station via an integrated access backhaul (IAB) radio network, wherein:

the IAB network comprises first and second nodes;
the first node comprises a communication interface and processing circuitry configured to perform operations corresponding to any of the methods of embodiments 1-14; and
the second node comprises a communication interface and processing circuitry configured to perform operations corresponding to any of the methods of embodiments 15-19.

28. The communication system of embodiment 27, further including the UE, wherein the UE is configured to communicate with the IAB node.

29. The communication system of any of embodiments 27-28, wherein:
the processing circuitry of the host computer is configured to execute a host application;
the UE is configured to execute a client application associated with the host application, thereby providing the user data to be received by the host computer.

The invention claimed is:

1. A method, performed by a first node in an integrated access backhaul (IAB) network, for scheduling uplink (UL) transmissions in the IAB network, the method comprising:
receiving, from a first downstream node in the IAB network, a first buffer status report (BSR) indicating a first amount of uplink (UL) data, wherein the first BSR includes a first hop count value that indicates a number of downstream intermediate nodes between the first downstream node and a further downstream node having buffered UL data included in the first amount, and wherein the first amount includes one or more of the following:
an amount of UL data buffered at the first downstream node, and
an amount of UL data expected to be received by the first downstream node;
sending, to the first downstream node, a first UL resource grant indicating a time schedule of resources available for the first downstream node to transmit at least a portion of the first amount of data; and
sending a second BSR to an upstream node in the IAB network, wherein:
the second BSR indicates a second amount of UL data; and
the second amount includes the at least a portion of the first amount and UL data buffered at the first node.

2. The method of claim 1, wherein the second amount of UL data indicated by the second BSR is based on one of the following:
the first amount of UL data indicated in the first BSR, or
an amount of UL data indicated by the first UL resource grant.

3. The method of claim 2, wherein the second amount of UL data indicated by the second BSR is further based on free buffer space available, at the first node, for receiving UL data from the first downstream node.

4. The method of claim 1, wherein the first UL resource grant is sent after receiving the first BSR and without receiving a second UL resource grant from the upstream node in response to the second BSR.

5. The method of claim 4, wherein the first UL resource grant is sent to the first downstream node before sending the second BSR to the upstream node.

6. The method of claim 1, further comprising incrementing the first hop count value to form a second hop count value, wherein the second hop count value is included in the second BSR sent to the upstream node.

7. The method of claim 1, further comprising determining one or more of the following based on the first hop count value:
the time schedule indicated by the UL grant, and
the second amount of UL data indicated by the second BSR.

8. The method of claim 1, wherein the first BSR includes a time value indicating when one of the following received a further BSR related to the first BSR:
the first downstream node, or
a second downstream node that is downstream in the IAB network with respect to the first downstream node.

9. The method of claim 8, further comprising determining one or more of the following based on the time value:
the time schedule indicated by the UL grant, and
the second amount of UL data indicated by the second BSR.

10. The method of claim 7, wherein determining the second amount of UL data indicated by the second BSR comprises:
reducing the first amount of UL data by a scaling factor that is dependent upon the first hop count value or the time value; and
determining the second amount of UL data based on the reduced first amount and the UL data buffered at the first node.

11. The method of claim 7, wherein determining the time schedule comprises:
estimating a delay based on one of the following:
a difference between the time value and a current time, or
the first hop count and scheduling information associated with the further downstream node having buffered UL data included in the first amount; and
based on the estimated delay, determining the time schedule such that the first UL resource grant becomes valid when the UL data buffered at the further downstream node is available at the first downstream node.

12. The method of claim 1, wherein:
the first node is an intermediate IAB node in the IAB network;
the first node includes a distributed unit (DU) part and a mobile terminal (MT) part;
receiving the first BSR and sending the first UL resource grant is performed by the DU part; and
sending the second BSR is performed by the MT part.

13. The method of claim 12, wherein:
the first downstream node is an intermediate node in the IAB network; and
the amount of UL data expected to be received by the first downstream node comprises UL data buffered at one or more second downstream nodes that are downstream in the IAB network with respect to the first downstream node.

14. The method of claim 12, wherein:
the first downstream node is a user equipment (UE); and
the first amount includes only the amount of UL data buffered at the UE.

15. The method of claim 1, wherein the first node is a donor distributed unit (DU) associated with a base station.

16. An integrated access backhaul (IAB) node configured for operation in a radio access network (RAN) the IAB node comprising:
communication interface circuitry configured to communicate with one or more downstream nodes and one or more upstream nodes in the RAN; and processing circuitry operably coupled with the communication interface circuitry, whereby the communication interface circuitry and the processing circuitry are configured to perform operations comprising:
- receiving, from a first downstream node in the IAB network, a first buffer status report (BSR) indicating a first amount of uplink (UL) data, wherein the first BSR includes a first hop count value that indicates a number of downstream intermediate nodes between the first downstream node and a further downstream node having buffered UL data included in the first amount, and wherein the first amount includes one or more of the following:
  - an amount of UL data buffered at the first downstream node, and
  - an amount of UL data expected to be received by the first downstream node;
- sending, to the first downstream node, a first UL resource grant indicating a time schedule of resources available for the first downstream node to transmit at least a portion of the first amount of data; and
- sending a second BSR to an upstream node in the IAB network, wherein:
  - the second BSR indicates a second amount of UL data; and
  - the second amount includes the at least a portion of the first amount and UL data buffered at the IAB node.

17. A non-transitory computer-readable medium storing program instructions that, when executed by processing circuitry of an integrated access backhaul (IAB) node in an IAB network, configure the IAB node to perform operations comprising:
- receiving, from a first downstream node in the TAB network, a first buffer status report (BSR) indicating a first amount of uplink (UL) data, wherein the first BSR includes a first hop count value that indicates a number of downstream intermediate nodes between the first downstream node and a further downstream node having buffered UL data included in the first amount, and wherein the first amount includes one or more of the following:
  - an amount of UL data buffered at the first downstream node, and
  - an amount of UL data expected to be received by the first downstream node;
- sending, to the first downstream node, a first UL resource grant indicating a time schedule of resources available for the first downstream node to transmit at least a portion of the first amount of data; and
- sending a second BSR to an upstream node in the TAB network, wherein:
  - the second BSR indicates a second amount of UL data; and
  - the second amount includes the at least a portion of the first amount and UL data buffered at the IAB node.

\* \* \* \* \*